(12) United States Patent
Rojer

(10) Patent No.: US 7,934,193 B2
(45) Date of Patent: Apr. 26, 2011

(54) PROCESSING A MODULE SPECIFICATION TO PRODUCE A MODULE DEFINITION

(76) Inventor: Alan S. Rojer, Maplewood, NJ (US)

( * ) Notice: Subject to any disclaimer, the term of this patent is extended or adjusted under 35 U.S.C. 154(b) by 1050 days.

(21) Appl. No.: 11/784,914

(22) Filed: Apr. 10, 2007

(65) Prior Publication Data

US 2007/0240110 A1    Oct. 11, 2007

Related U.S. Application Data

(60) Provisional application No. 60/791,128, filed on Apr. 11, 2006.

(51) Int. Cl.
*G06F 9/44* (2006.01)
(52) U.S. Cl. .................... 717/106; 717/108; 717/116
(58) Field of Classification Search .............. 717/108, 717/116
See application file for complete search history.

(56) References Cited

U.S. PATENT DOCUMENTS

| | | | |
|---|---|---|---|
| 4,734,854 A | | 3/1988 | Afshar |
| 5,265,206 A | * | 11/1993 | Shackelford et al. ......... 719/316 |
| 5,675,801 A | | 10/1997 | Lindsey |
| 5,699,310 A | | 12/1997 | Garloff |
| 6,721,807 B2 | | 4/2004 | Vlissides |
| 6,742,175 B1 | | 5/2004 | Brassard |
| 6,901,579 B1 | * | 5/2005 | Suguta ................ 717/108 |
| 7,076,766 B2 | | 7/2006 | Wirts |
| 7,130,863 B2 | | 10/2006 | Diab |
| 7,137,100 B2 | | 11/2006 | Iborra |
| 7,237,224 B1 | | 6/2007 | Motoyama |
| 7,293,254 B2 | | 11/2007 | Bloesch |
| 7,444,618 B2 | | 10/2008 | Kulkarni |
| 7,590,969 B2 | | 9/2009 | Rajagopal |
| 7,669,191 B1 | | 2/2010 | Kelly |
| 2005/0010894 A1 | | 1/2005 | Potter |
| 2006/0064667 A1 | | 3/2006 | Freitas |
| 2007/0079299 A1 | | 4/2007 | Daly |

OTHER PUBLICATIONS

Fernandez et al. "A Sensitive Metric of Class Cohesion", 2006, vol. 13, pp. 82-91.*
Patrick Un "Generation of Web Service Descriptions and Web Service Module Implementation for Concept-oriented content Management Systems", 2006.*
Hoglund "A Conduits+ and Java Implementation of the Internet Key Management Protocol", 1997.*
Parnas, A Technique for Software Module Specification ..., Comm. ACM 15:5, May 1972, pp. 330-336.
Buckles, Formal Module-Level Specifications, Proc. 1977 ACM Annual Conf., pp. 138-144.
Discepolo, Towards a Practical Specification Language, Proc. 1981 ACM Annual Conf., pp. 144-153.
Wasserman, The Object-Oriented Structured Design for Software Design Representation, Computer 23:3, Mar. 1990, 50-63.

(Continued)

*Primary Examiner* — Wei Y Zhen
*Assistant Examiner* — Phillip H Nguyen

(57) ABSTRACT

A computer-implemented method of processing a module specification to produce a module definition is disclosed. A module consists of a collection of interrelated classes for object-oriented programming. A module specification is an object-oriented data structure, the elements of which correspond to classes of a meta-module. A module definition is a collection of class definitions and other expressions in an object-oriented programming language. The module specification includes unitary and categorical class specifications. The class specifications include member specifications. The module definition may include definitions for a unitary host class, a unitary viewer class, a unitary editor class, and categorical class definitions corresponding to the categorical class specifications.

18 Claims, 32 Drawing Sheets

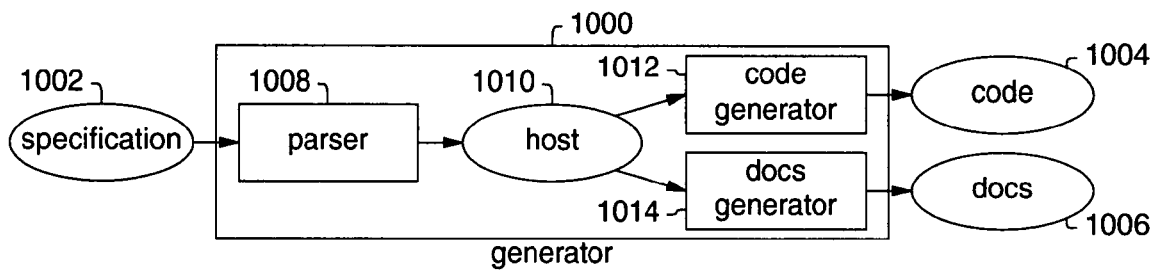

OTHER PUBLICATIONS

Dedene, M.E.R.O.DE: A Model-driven Entity-Relationship Object-Oriented DEvelopment method, ACM SIGSOFT Software Engineering Notes 19:3, Jul. 1993, pp. 51-61.

Gamma, Design Patterns, Addison-Wesley, Reading, MA, 1995, pp. 331-344.

Cowan, Abstract Data Views: An Interface Specification Concept to Enhance Design for Reuse, IEEE Trans. on Software Engineering 21:3, Mar. 1995, pp. 229-243.

Palsberg, The Essence of the Visitor Pattern, 22nd International Computer Software and Application Conference, 1998, pp. 9 (IEEE Computer Society).

Mellor, Model-Driven Development, IEEE Software 20:5, Sep./Oct. 2003, pp. 14-18.

Bell, Death by UML Fever, ACM Queue 2:1, Mar. 2004, pp. 73-81.

Budinsky, Eclipse Modeling Framework, Addison-Wesley, Boston MA, 2004, pp. 95-113, 161-212.

Fowler, JeeWiz! Meta-Programming for the Real World, New Technology/enterprise Ltd, Nov. 2004, http://www.jeewiz.com/white_papers/TalkNotes_OOPSLA2004.pdf.

Object Management Group, Meta Object Facility (MOF) Core Specification, Version 2.0, formal/Jun. 1, 2001, Jan. 2006, http://www.omg.org/spec/MOF/2.0/PDF/.

Balasubramanian, Developing Applications Using Model-Driven Design Environments, Computer 39:2, Feb. 2006, pp. 33-40.

Stahl, Model-Driven Software Development, John Wiley & Sons, Ltd., 2006, pp. 85-118.

* cited by examiner

FIG. 1

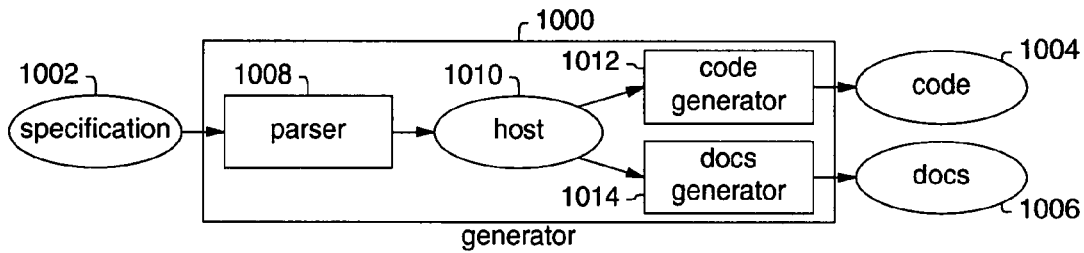

FIG. 2

```
dish¹⁰¹⁶ [
  viewer dishViewer¹⁰¹⁸;
] {
  dishEntity¹⁰²⁰ {
    Text id¹⁰²²;
    dishModule¹⁰²⁴ {
      Sequence<dishClass¹⁰³⁴> classes¹⁰²⁶ [meron];
      dishHostClass¹⁰⁴⁰ host¹⁰²⁸ [meron];
      Text viewer_id¹⁰³⁰;
      Text editor_id¹⁰³²;
    }
    dishClass¹⁰³⁴ {
      Sequence<dishClass¹⁰³⁴> genera¹⁰³⁶;
      Sequence<dishMember¹⁰⁴⁸> members¹⁰³⁸ [meron];
      dishHostClass¹⁰⁴⁰ {}
    }
    dishOperand¹⁰⁴² {
      Text scope_id¹⁰⁴⁴;
      dishType¹⁰⁵⁴ type¹⁰⁴⁶;
      dishMember¹⁰⁴⁸ {
        dishMemberDatum¹⁰⁵⁰ {
          Boolean is_meron¹⁰⁵²;
        }
      }
    }
  }
}
```

FIG. 3

```
dish¹⁰¹⁶ {
    dishType¹⁰⁵⁴ {
        dishValueType¹⁰⁵⁶ {
            dishBitType¹⁰⁵⁸ {}
            dishTextType¹⁰⁶⁰ {}
        }
        dishReferenceType¹⁰⁶² {
            Text reference_class_id¹⁰⁶⁴;
        }
        dishCompoundType¹⁰⁶⁶ {
            dishType¹⁰⁵⁴ range¹⁰⁶⁸;
            dishSequenceType¹⁰⁷⁰ {
                dishValueSequenceType¹⁰⁷² {}
                dishReferenceSequenceType¹⁰⁷⁴ {}
            }
            dishSetType¹⁰⁷⁶ {
                dishValueSetType¹⁰⁷⁸ {}
                dishReferenceSetType¹⁰⁸⁰ {}
            }
            dishMapType¹⁰⁸² {
                dishType¹⁰⁵⁴ domain¹⁰⁸⁴;
                dishIndexMapType¹⁰⁸⁶ {}
                dishScaleMapType¹⁰⁸⁸ {}
                dishBindMapType¹⁰⁹⁰ {}
                dishConvertMapType¹⁰⁹² {}
            }
        }
    }
}
```

FIG. 4

```
class dishViewer^1018 {
public:
   /* Class Views^1094 */
   /* Meron View Dispatches^1096 */
   /* Base View Dispatches^1098 */
   /* Aggregate View Dispatches^1100 */
public: // failure state and action...
   bool failed^1102;
   bool fail^1104(Text msg) {
      /* report msg */;
      failed^1102 = 1;
      return 0; }
};
```

FIG. 5

```
class dishEntity^1020 {
public: // features...
   Text id^1022;
public: // dispatch to viewer...
   virtual bool dispatch_view^1106(dishViewer^1018 &v) const {
      return v.view^1108(this); }
};
```

FIG. 6

```
/* dishEntity^1020 segment of */ class dishViewer^1018 {
public:
   virtual bool view^1108(const dishEntity^1020 *e) {
      return view_merons^1110(e) && view_base^1112(e); }
   bool view_merons^1110(const dishEntity^1020 *e) {return 1;}
   bool view_base^1112(const dishEntity^1020 *e) {return 1;}
};
```

FIG. 7

```
class dishModule¹⁰²⁴ : public dishEntity¹⁰²⁰ {
public: // features...
   Sequence<dishClass¹⁰³⁴*> classes¹⁰²⁶;
   dishHostClass¹⁰⁴⁰* host¹⁰²⁸;
   Text viewer_id¹⁰³⁰;
   Text editor_id¹⁰³²;
public: // dispatch to viewer...
   virtual bool dispatch_view¹¹¹⁴(dishViewer¹⁰¹⁸ &v) const {
      return v.view¹¹¹⁶(this); }
public: // cleanup...
   virtual ~dishModule¹⁰²⁴() {
      /* cleanup classes¹⁰²⁶ */
      /* cleanup host¹⁰²⁸ */ }
};
```

FIG. 8

```
/* dishModule¹⁰²⁴ segment of */ class dishViewer¹⁰¹⁸ {
public:
   virtual bool view¹¹¹⁶(const dishModule¹⁰²⁴ *e) {
      return view_merons¹¹¹⁸(e) && view_base¹¹²⁰(e); }
   bool view_merons¹¹¹⁸(const dishModule¹⁰²⁴ *e) {
      if (!view_agg¹¹²²(e->classes¹⁰²⁶)) return 0;
      return 1; }
   bool view_base¹¹²⁰(const dishModule¹⁰²⁴ *e) {
      return e->dishEntity¹⁰²⁰::dispatch_view¹¹⁰⁶(*this); }
   bool view_agg¹¹²²(const Sequence<dishClass¹⁰³⁴> &s) {
      foreach (const dishClass¹⁰³⁴ *e in s)
         if (!e->dispatch_view¹¹²⁴(*this)) return 0;
      return 1; }
};
```

FIG. 9

```
class dishClass¹⁰³⁴ : public dishEntity¹⁰²⁰ {
public: // features...
   Sequence<dishClass¹⁰³⁴*> genera¹⁰³⁶;
   Sequence<dishMember¹⁰⁴⁸*> members¹⁰³⁸;
public: // dispatch to viewer...
   virtual bool dispatch_view¹¹²⁴(dishViewer¹⁰¹⁸ &v) const {
      return v.view¹¹²⁶(this); }
public: // cleanup...
   virtual ~dishClass¹⁰³⁴() {
      /* cleanup members¹⁰³⁸ */ }
};
```

FIG. 10

```
/* dishClass^1034 segment of */ class dishViewer^1018 {
public:
    virtual bool view^1126(const dishClass^1034 *e) {
      return view_merons^1128(e) && view_base^1130(e); }
    bool view_merons^1128(const dishClass^1034 *e) {
      if (!view_agg^1132(e->members^1038)) return 0;
      return 1; }
    bool view_base^1130(const dishClass^1034 *e) {
      return e->dishEntity^1020::dispatch_view^1106(*this); }
    bool view_agg^1132(const Sequence<dishMember^1048> &s) {
      foreach (const dishMember^1048 *e in s)
        if (!e->dispatch_view^1134(*this)) return 0;
      return 1; }
};
```

FIG. 11

```
class dishHostClass^1040 : public dishClass^1034 {
public: // dispatch to viewer...
    virtual bool dispatch_view^1136(dishViewer^1018 &v) const {
      return v.view^1138(this); }
};
```

FIG. 12

```
/* dishHostClass^1040 segment of */ class dishViewer^1018 {
public:
    virtual bool view^1138(const dishHostClass^1040 *e) {
      return view_merons^1140(e) && view_base^1142(e); }
    bool view_merons^1140(const dishHostClass^1040 *e) {return 1;}
    bool view_base^1142(const dishHostClass^1040 *e) {
      return e->dishClass^1034::dispatch_view^1124(*this); }
};
```

FIG. 13

```
class dishOperand[1042] : public dishEntity[1020] {
public: // features...
   Text scope_id[1044];
   dishType[1054]* type[1046];
public: // dispatch to viewer...
   virtual bool dispatch_view[1144](dishViewer[1018] &v) const {
      return v.view[1146](this); }
};
```

FIG. 14

```
/* dishOperand[1042] segment of */ class dishViewer[1018] {
public:
   virtual bool view[1146](const dishOperand[1042] *e) {
      return view_merons[1148](e) && view_base[1150](e); }
   bool view_merons[1148](const dishOperand[1042] *e) {return 1;}
   bool view_base[1150](const dishOperand[1042] *e) {
      return e->dishEntity[1020]::dispatch_view[1106](*this); }
};
```

FIG. 15

```
class dishMember[1048] : public dishOperand[1042] {
public: // dispatch to viewer...
   virtual bool dispatch_view[1134](dishViewer[1018] &v) const {
      return v.view[1152](this); }
};
```

FIG. 16

```
/* dishMember[1048] segment of */ class dishViewer[1018] {
public:
   virtual bool view[1152](const dishMember[1048] *e) {
      return view_merons[1154](e) && view_base[1156](e); }
   bool view_merons[1154](const dishMember[1048] *e) {return 1;}
   bool view_base[1156](const dishMember[1048] *e) {
      return e->dishOperand[1042]::dispatch_view[1144](*this); }
};
```

FIG. 17

```
class dishMemberDatum^1050 : public dishMember^1048 {
public: // features...
   Boolean is_meron^1052;
public: // dispatch to viewer...
   virtual bool dispatch_view^1158(dishViewer^1018 &v) const {
     return v.view^1160(this); }
};
```

FIG. 18

```
/* dishMemberDatum^1050 segment of */ class dishViewer^1018 {
public:
   virtual bool view^1160(const dishMemberDatum^1050 *e) {
     return view_merons^1162(e) && view_base^1164(e); }
   bool view_merons^1162(const dishMemberDatum^1050 *e) {return 1;}
   bool view_base^1164(const dishMemberDatum^1050 *e) {
     return e->dishMember^1048::dispatch_view^1134(*this); }
};
```

FIG. 19

```
class dishType^1054 {
public: // dispatch to viewer...
   virtual bool dispatch_view^1166(dishViewer^1018 &v) const {
     return v.view^1168(this); }
};
```

FIG. 20

```
/* dishType^1054 segment of */ class dishViewer^1018 {
public:
   virtual bool view^1168(const dishType^1054 *e) {
     return view_merons^1170(e) && view_base^1172(e); }
   bool view_merons^1170(const dishType^1054 *e) {return 1;}
   bool view_base^1172(const dishType^1054 *e) {return 1;}
};
```

FIG. 21

```
class dishValueType¹⁰⁵⁶ : public dishType¹⁰⁵⁴ {
public: // dispatch to viewer...
   virtual bool dispatch_view¹¹⁷⁴(dishViewer¹⁰¹⁸ &v) const {
      return v.view¹¹⁷⁶(this); }
};
```

FIG. 22

```
/* dishValueType¹⁰⁵⁶ segment of */ class dishViewer¹⁰¹⁸ {
public:
   virtual bool view¹¹⁷⁶(const dishValueType¹⁰⁵⁶ *e) {
      return view_merons¹¹⁷⁸(e) && view_base¹¹⁸⁰(e); }
   bool view_merons¹¹⁷⁸(const dishValueType¹⁰⁵⁶ *e) {return 1;}
   bool view_base¹¹⁸⁰(const dishValueType¹⁰⁵⁶ *e) {
      return e->dishType¹⁰⁵⁴::dispatch_view¹¹⁶⁶(*this); }
};
```

FIG. 23

```
class dishBitType¹⁰⁵⁸ : public dishValueType¹⁰⁵⁶ {
public: // dispatch to viewer...
   virtual bool dispatch_view¹¹⁸²(dishViewer¹⁰¹⁸ &v) const {
      return v.view¹¹⁸⁴(this); }
};
```

FIG. 24

```
/* dishBitType¹⁰⁵⁸ segment of */ class dishViewer¹⁰¹⁸ {
public:
   virtual bool view¹¹⁸⁴(const dishBitType¹⁰⁵⁸ *e) {
      return view_merons¹¹⁸⁶(e) && view_base¹¹⁸⁸(e); }
   bool view_merons¹¹⁸⁶(const dishBitType¹⁰⁵⁸ *e) {return 1;}
   bool view_base¹¹⁸⁸(const dishBitType¹⁰⁵⁸ *e) {
      return e->dishValueType¹⁰⁵⁶::dispatch_view¹¹⁷⁴(*this); }
};
```

FIG. 25

```
class dishTextType^1060 : public dishValueType^1056 {
public: // dispatch to viewer...
    virtual bool dispatch_view^1190(dishViewer^1018 &v) const {
        return v.view^1192(this); }
};
```

FIG. 26

```
/* dishTextType^1060 segment of */ class dishViewer^1018 {
public:
    virtual bool view^1192(const dishTextType^1060 *e) {
        return view_merons^1194(e) && view_base^1196(e); }
    bool view_merons^1194(const dishTextType^1060 *e) {return 1;}
    bool view_base^1196(const dishTextType^1060 *e) {
        return e->dishValueType^1056::dispatch_view^1174(*this); }
};
```

FIG. 27

```
class dishReferenceType^1062 : public dishType^1054 {
public: // features...
    Text reference_class_id^1064;
public: // dispatch to viewer...
    virtual bool dispatch_view^1198(dishViewer^1018 &v) const {
        return v.view^1200(this); }
};
```

FIG. 28

```
/* dishReferenceType^1062 segment of */ class dishViewer^1018 {
public:
    virtual bool view^1200(const dishReferenceType^1062 *e) {
        return view_merons^1202(e) && view_base^1204(e); }
    bool view_merons^1202(const dishReferenceType^1062 *e) {return 1;}
    bool view_base^1204(const dishReferenceType^1062 *e) {
        return e->dishType^1054::dispatch_view^1166(*this); }
};
```

FIG. 29

```
class dishCompoundType^1066 : public dishType^1054 {
public: // features...
   dishType^1054* range^1068;
public: // dispatch to viewer...
   virtual bool dispatch_view^1206(dishViewer^1018 &v) const {
      return v.view^1208(this); }
};
```

FIG. 30

```
/* dishCompoundType^1066 segment of */ class dishViewer^1018 {
public:
   virtual bool view^1208(const dishCompoundType^1066 *e) {
      return view_merons^1210(e) && view_base^1212(e); }
   bool view_merons^1210(const dishCompoundType^1066 *e) {return 1;}
   bool view_base^1212(const dishCompoundType^1066 *e) {
      return e->dishType^1054::dispatch_view^1166(*this); }
};
```

FIG. 31

```
class dishSequenceType^1070 : public dishCompoundType^1066 {
public: // dispatch to viewer...
   virtual bool dispatch_view^1214(dishViewer^1018 &v) const {
      return v.view^1216(this); }
};
```

FIG. 32

```
/* dishSequenceType^1070 segment of */ class dishViewer^1018 {
public:
   virtual bool view^1216(const dishSequenceType^1070 *e) {
      return view_merons^1218(e) && view_base^1220(e); }
   bool view_merons^1218(const dishSequenceType^1070 *e) {return 1;}
   bool view_base^1220(const dishSequenceType^1070 *e) {
      return e->dishCompoundType^1066::dispatch_view^1206(*this); }
};
```

*FIG. 33*

```
class dishValueSequenceType^1072 : public dishSequenceType^1070 {
public: // dispatch to viewer...
   virtual bool dispatch_view^1222(dishViewer^1018 &v) const {
     return v.view^1224(this); }
};
```

*FIG. 34*

```
/* dishValueSequenceType^1072 segment of */ class dishViewer^1018 {
public:
   virtual bool view^1224(const dishValueSequenceType^1072 *e) {
     return view_merons^1226(e) && view_base^1228(e); }
   bool view_merons^1226(const dishValueSequenceType^1072 *e) {return 1;}
   bool view_base^1228(const dishValueSequenceType^1072 *e) {
     return e->dishSequenceType^1070::dispatch_view^1214(*this); }
};
```

*FIG. 35*

```
class dishReferenceSequenceType^1074 : public dishSequenceType^1070 {
public: // dispatch to viewer...
   virtual bool dispatch_view^1230(dishViewer^1018 &v) const {
     return v.view^1232(this); }
};
```

*FIG. 36*

```
/* dishReferenceSequenceType^1074 segment of */ class dishViewer^1018 {
public:
   virtual bool view^1232(const dishReferenceSequenceType^1074 *e) {
     return view_merons^1234(e) && view_base^1236(e); }
   bool view_merons^1234(const dishReferenceSequenceType^1074 *e) {return 1;}
   bool view_base^1236(const dishReferenceSequenceType^1074 *e) {
     return e->dishSequenceType^1070::dispatch_view^1214(*this); }
};
```

FIG. 37

```
class dishSetType^1076 : public dishCompoundType^1066 {
public: // dispatch to viewer...
   virtual bool dispatch_view^1238(dishViewer^1018 &v) const {
      return v.view^1240(this); }
};
```

FIG. 38

```
/* dishSetType^1076 segment of */ class dishViewer^1018 {
public:
   virtual bool view^1240(const dishSetType^1076 *e) {
      return view_merons^1242(e) && view_base^1244(e); }
   bool view_merons^1242(const dishSetType^1076 *e) {return 1;}
   bool view_base^1244(const dishSetType^1076 *e) {
      return e->dishCompoundType^1066::dispatch_view^1206(*this); }
};
```

FIG. 39

```
class dishValueSetType^1078 : public dishSetType^1076 {
public: // dispatch to viewer...
   virtual bool dispatch_view^1246(dishViewer^1018 &v) const {
      return v.view^1248(this); }
};
```

FIG. 40

```
/* dishValueSetType^1078 segment of */ class dishViewer^1018 {
public:
   virtual bool view^1248(const dishValueSetType^1078 *e) {
      return view_merons^1250(e) && view_base^1252(e); }
   bool view_merons^1250(const dishValueSetType^1078 *e) {return 1;}
   bool view_base^1252(const dishValueSetType^1078 *e) {
      return e->dishSetType^1076::dispatch_view^1238(*this); }
};
```

FIG. 41

```
class dishReferenceSetType1080 : public dishSetType1076 {
public: // dispatch to viewer...
   virtual bool dispatch_view1254(dishViewer1018 &v) const {
     return v.view1256(this); }
};
```

FIG. 42

```
/* dishReferenceSetType1080 segment of */ class dishViewer1018 {
public:
   virtual bool view1256(const dishReferenceSetType1080 *e) {
     return view_merons1258(e) && view_base1260(e); }
   bool view_merons1258(const dishReferenceSetType1080 *e) {return 1;}
   bool view_base1260(const dishReferenceSetType1080 *e) {
     return e->dishSetType1076::dispatch_view1238(*this); }
};
```

FIG. 43

```
class dishMapType1082 : public dishCompoundType1066 {
public: // features...
   dishType1054* domain1084;
public: // dispatch to viewer...
   virtual bool dispatch_view1262(dishViewer1018 &v) const {
     return v.view1264(this); }
};
```

FIG. 44

```
/* dishMapType1082 segment of */ class dishViewer1018 {
public:
   virtual bool view1264(const dishMapType1082 *e) {
     return view_merons1266(e) && view_base1268(e); }
   bool view_merons1266(const dishMapType1082 *e) {return 1;}
   bool view_base1268(const dishMapType1082 *e) {
     return e->dishCompoundType1066::dispatch_view1206(*this); }
};
```

FIG. 45

```
class dishIndexMapType^1086 : public dishMapType^1082 {
public: // dispatch to viewer...
  virtual bool dispatch_view^1270(dishViewer^1018 &v) const {
    return v.view^1272(this); }
};
```

FIG. 46

```
/* dishIndexMapType^1086 segment of */ class dishViewer^1018 {
public:
  virtual bool view^1272(const dishIndexMapType^1086 *e) {
    return view_merons^1274(e) && view_base^1276(e); }
  bool view_merons^1274(const dishIndexMapType^1086 *e) {return 1;}
  bool view_base^1276(const dishIndexMapType^1086 *e) {
    return e->dishMapType^1082::dispatch_view^1262(*this); }
};
```

FIG. 47

```
class dishScaleMapType^1088 : public dishMapType^1082 {
public: // dispatch to viewer...
  virtual bool dispatch_view^1278(dishViewer^1018 &v) const {
    return v.view^1280(this); }
};
```

FIG. 48

```
/* dishScaleMapType^1088 segment of */ class dishViewer^1018 {
public:
  virtual bool view^1280(const dishScaleMapType^1088 *e) {
    return view_merons^1282(e) && view_base^1284(e); }
  bool view_merons^1282(const dishScaleMapType^1088 *e) {return 1;}
  bool view_base^1284(const dishScaleMapType^1088 *e) {
    return e->dishMapType^1082::dispatch_view^1262(*this); }
};
```

*FIG. 49*

```
class dishBindMapType^1090 : public dishMapType^1082 {
public: // dispatch to viewer...
   virtual bool dispatch_view^1286(dishViewer^1018 &v) const {
      return v.view^1288(this); }
};
```

*FIG. 50*

```
/* dishBindMapType^1090 segment of */ class dishViewer^1018 {
public:
   virtual bool view^1288(const dishBindMapType^1090 *e) {
      return view_merons^1290(e) && view_base^1292(e); }
   bool view_merons^1290(const dishBindMapType^1090 *e) {return 1;}
   bool view_base^1292(const dishBindMapType^1090 *e) {
      return e->dishMapType^1082::dispatch_view^1262(*this); }
};
```

*FIG. 51*

```
class dishConvertMapType^1092 : public dishMapType^1082 {
public: // dispatch to viewer...
   virtual bool dispatch_view^1294(dishViewer^1018 &v) const {
      return v.view^1296(this); }
};
```

*FIG. 52*

```
/* dishConvertMapType^1092 segment of */ class dishViewer^1018 {
public:
   virtual bool view^1296(const dishConvertMapType^1092 *e) {
      return view_merons^1298(e) && view_base^1300(e); }
   bool view_merons^1298(const dishConvertMapType^1092 *e) {return 1;}
   bool view_base^1300(const dishConvertMapType^1092 *e) {
      return e->dishMapType^1082::dispatch_view^1262(*this); }
};
```

FIG. 53

```
    class dishTypeDefiner1302 : public dishViewer1018 {
    public: // data...
      Text type_id1304;
      Text def1306;
      Text typedef1308;
      Text include1310;
      Text template1312;
    public: // entries and categorical views...
      dishTypeDefiner1314(const dishType1054*);
      virtual bool view1320(const dishBitType1058*);
      virtual bool view1328(const dishTextType1060*);
      virtual bool view1336(const dishReferenceType1062*);
      virtual bool view1346(const dishCompoundType1066*);
      virtual bool view1354(const dishSequenceType1070*);
      virtual bool view1370(const dishReferenceSequenceType1074*);
      virtual bool view1380(const dishValueSequenceType1072*);
      virtual bool view1390(const dishSetType1076*);
      virtual bool view1406(const dishReferenceSetType1080*);
      virtual bool view1416(const dishValueSetType1078*);
      virtual bool view1426(const dishMapType1082*);
      virtual bool view1444(const dishIndexMapType1086*);
      virtual bool view1454(const dishScaleMapType1088*);
      virtual bool view1464(const dishBindMapType1090*);
      virtual bool view1474(const dishConvertMapType1092*);
    };
```

FIG. 54

```
dishTypeDefiner1302::dishTypeDefiner1314(
  const dishType1054* type1316
) {
  /* 1318: */ type1316->dispatch_view1166(*this);
}
```

FIG. 55

```
bool dishTypeDefiner1302::view1320(
  const dishBitType1058* bit_type1322
) {
  /* 1324: */ type_id1304 << "bool";
  /* 1326: */ return 1;
}
```

FIG. 56

```
bool dishTypeDefiner^1302::view^1328(
    const dishTextType^1060* text_type^1330
) {
    /* 1332: */ type_id^1304 << "Text";
    /* 1334: */ return 1;
}
```

FIG. 57

```
bool dishTypeDefiner^1302::view^1336(
    const dishReferenceType^1062* reference_type^1338
) {
    /* 1340: */ type_id^1304 << reference_type^1338->reference_class_id^1064;
    /* 1342: */ def^1306.printf("%s*", reference_type^1338->reference_class_id^1064);
    /* 1344: */ return 1;
}
```

FIG. 58

```
bool dishTypeDefiner^1302::view^1346(
    const dishCompoundType^1066* compound_type^1348
) {
    /* 1350: */ typedef^1308.printf("typedef %s %s", type_id^1304, def^1306);
    /* 1352: */ return 1;
}
```

FIG. 59

```
bool dishTypeDefiner^1302::view^1354(
    const dishSequenceType^1070* sequence_type^1356
) {
    /* 1358: */ include^1310 << "include Sequence.h";
    /* 1360: */ dishTypeDefiner^1302 range_formatter(sequence_type^1356->range^1068);
    /* 1362: */ def^1306.printf("%s<%s>", range_formatter.type_id^1304, template^1312);
    /* 1364: */ type_id^1304.printf("%sSequence", range_formatter.type_id^1304);
    /* 1366: */ view_base^1220(sequence_type^1356);
    /* 1368: */ return 1;
}
```

*FIG. 60*

```
bool dishTypeDefiner1302::view1370(
  const dishReferenceSequenceType1074* reference_sequence_type1372
) {
  /* 1374: */ template1312 << "PointerSequence";
  /* 1376: */ view_base1236(reference_sequence_type1372);
  /* 1378: */ return 1;
}
```

*FIG. 61*

```
bool dishTypeDefiner1302::view1380(
  const dishValueSequenceType1072* value_sequence_type1382
) {
  /* 1384: */ template1312 << "Sequence";
  /* 1386: */ view_base1228(value_sequence_type1382);
  /* 1388: */ return 1;
}
```

*FIG. 62*

```
bool dishTypeDefiner1302::view1390(
  const dishSetType1076* set_type1392
) {
  /* 1394: */ include1310 << "include Set.h";
  /* 1396: */ dishTypeDefiner1302 range_formatter(set_type1392->range1068);
  /* 1398: */ def1306.printf("%s<%s>", range_formatter.type_id1304, template1312);
  /* 1400: */ type_id1304.printf("%sSet", range_formatter.type_id1304);
  /* 1402: */ view_base1244(set_type1392);
  /* 1404: */ return 1;
}
```

*FIG. 63*

```
bool dishTypeDefiner1302::view1406(
  const dishReferenceSetType1080* reference_set_type1408
) {
  /* 1410: */ template1312 << "PointerSet";
  /* 1412: */ view_base1260(reference_set_type1408);
  /* 1414: */ return 1;
}
```

*FIG. 64*

```
bool dishTypeDefiner1302::view1416(
  const dishValueSetType1078* value_set_type1418
) {
  /* 1420: */ template1312 << "Set";
  /* 1422: */ view_base1252(value_set_type1418);
  /* 1424: */ return 1;
}
```

*FIG. 65*

```
bool dishTypeDefiner1302::view1426(
  const dishMapType1082* map_type1428
) {
  /* 1430: */ include1310 << "include Map.h";
  /* 1432: */ dishTypeDefiner1302 range_formatter(map_type1428->range1068);
  /* 1434: */ dishTypeDefiner1302 domain_formatter(map_type1428->domain1084);
  /* 1436: */ def1306.printf(
    "%s<%s, %s>",
    range_formatter.type_id1304,
    domain_formatter.type_id1304,
    template1312);
  /* 1438: */ type_id1304.printf(
    "%s%sSet",
    range_formatter.type_id1304,
    domain_formatter.type_id1304,
    template1312);
  /* 1440: */ view_base1268(map_type1428);
  /* 1442: */ return 1;
}
```

*FIG. 66*

```
bool dishTypeDefiner1302::view1444(
  const dishIndexMapType1086* index_map_type1446
) {
  /* 1448: */ template1312 << "Index";
  /* 1450: */ view_base1275(index_map_type1446);
  /* 1452: */ return 1;
}
```

FIG. 67

```
bool dishTypeDefiner[1302]::view[1454](
    const dishScaleMapType[1088]* scale_map_type[1456]
) {
    /* 1458: */ template[1312] << "Scale";
    /* 1460: */ view_base[1284](scale_map_type[1456]);
    /* 1462: */ return 1;
}
```

FIG. 68

```
bool dishTypeDefiner[1302]::view[1464](
    const dishBindMapType[1090]* bind_map_type[1466]
) {
    /* 1468: */ template[1312] << "Bind";
    /* 1470: */ view_base[1292](bind_map_type[1466]);
    /* 1472: */ return 1;
}
```

FIG. 69

```
bool dishTypeDefiner[1302]::view[1474](
    const dishConvertMapType[1092]* convert_map_type[1476]
) {
    /* 1478: */ template[1312] << "Convert";
    /* 1480: */ view_base[1300](convert_map_type[1476]);
    /* 1482: */ return 1;
}
```

FIG. 70

```
class dishForwardsWriter^1484 : public dishViewer^1018 {
public: // data...
  Text viewer_forward^1486;
  Text forwards^1488;
  Text editor_forward^1490;
  Text cat_forward^1492;
  Set<Text> includes^1494;
  Set<Text> typedefs^1496;
  Text host_forward^1498;
public: // entries and categorical views...
  dishForwardsWriter^1500(const dishModule^1024*);
  virtual bool view^1516(const dishClass^1034*);
  virtual bool view^1528(const dishMemberDatum^1050*);
  virtual bool view^1540(const dishHostClass^1040*);
};
```

FIG. 71

```
dishForwardsWriter^1484::dishForwardsWriter^1500(
  const dishModule^1024* module^1502
) {
  /* 1504: */ view_agg^1122(module^1502->classes^1026);
  /* 1506: */ module^1502->host^1028->dispatch_view^1136(*this);
  /* 1508: */ viewer_forward^1486.printf("class %s;", module^1502->viewer_id^1030);
  /* 1510: */ forwards^1488 << viewer_forward^1486;
  /* 1512: */ editor_forward^1490.printf("class %s;", module^1502->editor_id^1032);
  /* 1514: */ forwards^1488 << editor_forward^1490;
}
```

FIG. 72

```
bool dishForwardsWriter^1484::view^1516(
  const dishClass^1034* class^1518
) {
  /* 1520: */ cat_forward^1492.printf("class %s;", class^1518->id^1022);
  /* 1522: */ forwards^1488 << cat_forward^1492;
  /* 1524: */ view_agg^1132(class^1518->members^1038);
  /* 1526: */ return 1;
}
```

FIG. 73

```
bool dishForwardsWriter1484::view1528(
  const dishMemberDatum1050* member_datum1530
) {
  /* 1532: */ dishTypeDefiner1302 type_definer(member_datum1530->type1046);
  /* 1534: */ includes1494 << type_definer.include1310;
  /* 1536: */ typedefs1496 << type_definer.typedef1308;
  /* 1538: */ return 1;
}
```

FIG. 74

```
bool dishForwardsWriter1484::view1540(
  const dishHostClass1040* host_class1542
) {
  /* 1544: */ host_forward1498.printf("class %s;", host_class1542->id1022);
  /* 1546: */ forwards1488 << host_forward1498;
  /* 1548: */ return 1;
}
```

FIG. 75

```
class dishModuleDatumWriter1550 : public dishViewer1018 {
public: // data...
  Text datum_def1552;
  Text initializer1554;
  Text cleanup1556;
  Text meron_view_dispatch1558;
  Text meron_edit_dispatch1560;
  Text view_access_def1562;
  Text view_access_defs1564;
  Text reset_access_def1566;
  Text reset_access_defs1568;
  Text edit_access_def1570;
  Text edit_access_defs1572;
public: // entries and categorical views...
  dishModuleDatumWriter1574(const dishMemberDatum1050*);
  virtual bool view1584(const dishValueType1056*);
  virtual bool view1598(const dishReferenceType1062*);
  virtual bool view1628(const dishCompoundType1066*);
  virtual bool view1646(const dishReferenceSequenceType1074*);
  virtual bool view1658(const dishReferenceSetType1080*);
};
```

FIG. 76

```
dishModuleDatumWriter¹⁵⁵⁰::dishModuleDatumWriter¹⁵⁷⁴(
  const dishMemberDatum¹⁰⁵⁰* member_datum¹⁵⁷⁶
) {
  /* 1578: */ dishTypeDefiner¹³⁰² type_definer(member_datum¹⁵⁷⁶->type¹⁰⁴⁶);
  /* 1580: */ datum_def¹⁵⁵².printf(
    "%s %s",
    member_datum¹⁵⁷⁶->scope_id¹⁰⁴⁴,
    type_definer.type_id¹³⁰⁴);
  /* 1582: */ member_datum¹⁵⁷⁶->type¹⁰⁴⁶->dispatch_view¹¹⁶⁶(*this);
}
```

FIG. 77

```
bool dishModuleDatumWriter¹⁵⁵⁰::view¹⁵⁸⁴(
  const dishValueType¹⁰⁵⁶* value_type¹⁵⁸⁶
) {
  /* 1588: */ view_access_def¹⁵⁶².printf(
    "%s %s() const",
    datum->scope_id¹⁰⁴⁴,
    type_definer.type_id¹³⁰⁴);
  /* 1590: */ view_access_defs¹⁵⁶⁴ << view_access_def¹⁵⁶²;
  /* 1592: */ reset_access_def¹⁵⁶⁶.printf(
    "void set_%s(%s)",
    datum->scope_id¹⁰⁴⁴,
    type_definer.type_id¹³⁰⁴);
  /* 1594: */ reset_access_defs¹⁵⁶⁸ << reset_access_def¹⁵⁶⁶;
  /* 1596: */ return 1;
}
```

FIG. 78

```
bool dishModuleDatumWriter[1550]::view[1598](
  const dishReferenceType[1062]* reference_type[1600]
) {
  /* 1602: */ view_access_def[1562].printf(
    "const %s* %s() const",
    datum->scope_id[1044],
    type_definer.type_id[1304]);
  /* 1604: */ view_access_defs[1564] << view_access_def[1562];
  /* 1606: */ edit_access_def[1570].printf(
    "%s* %s(%s)",
    datum->scope_id[1044],
    type_definer.type_id[1304]);
  /* 1608: */ edit_access_defs[1572] << edit_access_def[1570];
  /* 1610: */ reset_access_def[1566].printf(
    "void set_%s(%s*)",
    datum->scope_id[1044],
    type_definer.type_id[1304]);
  /* 1612: */ initializer[1554] << "0";
  /* 1614: */ if (datum->is_meron[1052]) {
    /* 1616: */ cleanup[1556].printf("delete %s;", datum->scope_id[1044]);
    /* 1618: */ reset_access_def[1566].printf(
      "delete %s;",
      datum->scope_id[1044]);
    /* 1620: */ meron_view_dispatch[1558].printf(
      "%s->dispatch_view(viewer)",
      datum->scope_id[1044]);
    /* 1622: */ meron_edit_dispatch[1560].printf(
      "%s->dispatch_edit(viewer)",
      datum->scope_id[1044]);
  }
  /* 1624: */ reset_access_defs[1568] << reset_access_def[1566];
  /* 1626: */ return 1;
}
```

FIG. 79

```
bool dishModuleDatumWriter¹⁵⁵⁰::view¹⁶²⁸(
  const dishCompoundType¹⁰⁶⁶* compound_type¹⁶³⁰
) {
  /* 1632: */ view_access_def¹⁵⁶².printf(
    "const %s& %s() const",
    datum->scope_id¹⁰⁴⁴,
    type_definer.type_id¹³⁰⁴);
  /* 1634: */ view_access_defs¹⁵⁶⁴ << view_access_def¹⁵⁶²;
  /* 1636: */ edit_access_def¹⁵⁷⁰.printf(
    "%s& %s(%s)",
    datum->scope_id¹⁰⁴⁴,
    type_definer.type_id¹³⁰⁴);
  /* 1638: */ edit_access_defs¹⁵⁷² << edit_access_def¹⁵⁷⁰;
  /* 1640: */ if (datum->is_meron¹⁰⁵²) {
    /* 1642: */ cleanup¹⁵⁵⁶.printf(
      "/* delete elements of %s */",
      datum->scope_id¹⁰⁴⁴);
  }
  /* 1644: */ return 1;
}
```

FIG. 80

```
bool dishModuleDatumWriter¹⁵⁵⁰::view¹⁶⁴⁶(
  const dishReferenceSequenceType¹⁰⁷⁴* reference_sequence_type¹⁶⁴⁸
) {
  /* 1650: */ if (datum->is_meron¹⁰⁵²) {
    /* 1652: */ meron_view_dispatch¹⁵⁵⁸.printf(
      "view_agg(%s)",
      datum->scope_id¹⁰⁴⁴);
    /* 1654: */ meron_edit_dispatch¹⁵⁶⁰.printf(
      "edit_agg(%s)",
      datum->scope_id¹⁰⁴⁴);
  }
  /* 1656: */ return 1;
}
```

FIG. 81

```
bool dishModuleDatumWriter$^{1550}$::view$^{1658}$(
  const dishReferenceSetType$^{1080}$* reference_set_type$^{1660}$
) {
  /* 1662: */ if (datum->is_meron$^{1052}$) {
    /* 1664: */ meron_view_dispatch$^{1558}$.printf(
      "view_agg(%s)",
      datum->scope_id$^{1044}$);
    /* 1666: */ meron_edit_dispatch$^{1560}$.printf(
      "edit_agg(%s)",
      datum->scope_id$^{1044}$);
  }
  /* 1668: */ return 1;
}
```

FIG. 82

```
class dishModuleClassWriter$^{1670}$ : public dishViewer$^{1018}$ {
public: // data...
  Text cat_def$^{1672}$;
  Text class_view$^{1674}$;
  Text class_edit$^{1676}$;
  Text meron_view_dispatches$^{1678}$;
  Text meron_edit_dispatches$^{1680}$;
  Text datum_defs$^{1682}$;
  Text base_view_dispatch$^{1684}$;
  Text base_view_dispatches$^{1686}$;
  Text view_dispatch$^{1688}$;
  Text base_edit_dispatch$^{1690}$;
  Text base_edit_dispatches$^{1692}$;
  Text edit_dispatch$^{1694}$;
  Text initializers$^{1696}$;
  Text cleanups$^{1698}$;
public: // entries and categorical views...
  dishModuleClassWriter$^{1700}$(const dishClass$^{1034}$*);
  virtual bool view$^{1736}$(const dishMemberDatum$^{1050}$*);
};
```

FIG. 83

```
dishModuleClassWriter¹⁶⁷⁰::dishModuleClassWriter¹⁷⁰⁰(
  const dishClass¹⁰³⁴* class¹⁷⁰²
) {
  /* 1704: */ view_agg¹¹³²(class¹⁷⁰²->members¹⁰³⁸);
  /* 1706: */ class_view¹⁶⁷⁴ << meron_view_dispatches¹⁶⁷⁸;
  /* 1708: */ class_edit¹⁶⁷⁶ << meron_edit_dispatches¹⁶⁸⁰;
  /* 1710: */ cat_def¹⁶⁷² << datum_defs¹⁶⁸²;
  /* 1712: */ foreach (genus in class¹⁷⁰²->genera¹⁰³⁶) {
    /* 1714: */ base_view_dispatch¹⁶⁸⁴.printf(
      "e->%s::dispatch_view(*this)",
      genus);
    /* 1716: */ base_view_dispatches¹⁶⁸⁶ << base_view_dispatch¹⁶⁸⁴;
  }
  /* 1718: */ class_view¹⁶⁷⁴ << base_view_dispatches¹⁶⁸⁶;
  /* 1720: */ view_dispatch¹⁶⁸⁸
    << "bool dispatch_view(Visitor& v) const"
    << "{return v.view(this);}";
  /* 1722: */ cat_def¹⁶⁷² << view_dispatch¹⁶⁸⁸;
  /* 1724: */ foreach (genus in class¹⁷⁰²->genera¹⁰³⁶) {
    /* 1726: */ base_edit_dispatch¹⁶⁹⁰.printf(
      "e->%s::dispatch_edit(*this)",
      genus);
    /* 1728: */ base_edit_dispatches¹⁶⁹² << base_edit_dispatch¹⁶⁹⁰;
  }
  /* 1730: */ class_edit¹⁶⁷⁶ << base_edit_dispatches¹⁶⁹²;
  /* 1732: */ edit_dispatch¹⁶⁹⁴
    << "bool dispatch_edit(Visitor& v)"
    << "{return v.edit(this);}";
  /* 1734: */ cat_def¹⁶⁷² << edit_dispatch¹⁶⁹⁴;
}
```

FIG. 84

```
bool dishModuleClassWriter¹⁶⁷⁰::view¹⁷³⁶(
  const dishMemberDatum¹⁰⁵⁰* member_datum¹⁷³⁸
) {
  /* 1740: */ dishModuleDatumWriter¹⁵⁵⁰ datum_writer(member_datum¹⁷³⁸);
  /* 1742: */ datum_defs¹⁶⁸² << datum_writer.datum_def¹⁵⁵²;
  /* 1744: */ initializers¹⁶⁹⁶ << datum_writer.initializer¹⁵⁵⁴;
  /* 1746: */ cleanups¹⁶⁹⁸ << datum_writer.cleanup¹⁵⁵⁶;
  /* 1748: */ meron_view_dispatches¹⁶⁷⁸ << datum_writer.meron_view_dispatch¹⁵⁵⁸;
  /* 1750: */ return 1;
}
```

FIG. 85

```
class dishModuleWriter1752 : public dishViewer1018 {
public: // data...
  Text module_def1754;
  Text viewer1756;
  Text class_views1758;
  Text editor1760;
  Text class_edits1762;
  Text cat_defs1764;
  Text host_def1766;
public: // entries and categorical views...
  dishModuleWriter1768(const dishModule1024*);
  virtual bool view1780(const dishClass1034*);
  virtual bool view1794(const dishHostClass1040*);
};
```

FIG. 86

```
dishModuleWriter1752::dishModuleWriter1768(
  const dishModule1024* module1770
) {
  /* 1772: */ module1770->host1028->dispatch_view1136(*this);
  /* 1774: */ view_agg1122(module1770->classes1026);
  /* 1776: */ viewer1756 << class_views1758;
  /* 1778: */ editor1760 << class_edits1762;
}
```

FIG. 87

```
bool dishModuleWriter1752::view1780(
  const dishClass1034* class1782
) {
  /* 1784: */ dishModuleClassWriter1670 class_writer(class1782);
  /* 1786: */ cat_defs1764 << class_writer.cat_def1672;
  /* 1788: */ class_views1758 << class_writer.class_view1674;
  /* 1790: */ class_edits1762 << class_writer.class_edit1676;
  /* 1792: */ return 1;
}
```

*FIG. 88*

```
bool dishModuleWriter1752::view1794(
  const dishHostClass1040* host_class1796
) {
  /* 1798: */ dishModuleClassWriter1670 host_class_writer(host_class1796);
  /* 1800: */ host_def1766 << host_class_writer.datum_defs1682;
  /* 1802: */ return 1;
}
```

*FIG. 89*

```
# example dishModule1024...
mscan1804 [
  host mscanHost1806; # ...example host1028
  viewer mscanViewer1808 # ...specify viewer1756 definition
] {
  # example host1028 member...
  Set<mscanFile1810> _root_files1822 [meron];
     # ...example is_meron1052
  # example classes1026...
  mscanFile1810 {
    # example members1038...
    mscanDirectory1812 _parent1824; # ...example dishReferenceType1062
    Text _name1826; # ...example dishTextType1060
    # example genera1036...
    mscanDirectory1812 { # ...mscanDirectory1812 has genus mscanFile1810
      Set<mscanFile1810> _files1828 [meron];
         # ...example is_meron1052
         # ...example dishReferenceSetType1080
      mscanTopDirectory1814 {}
    }
    mscanRegularFile1816 {
      mscanAudioFile1818 {}
      mscanVideoFile1820 {}
    }
  }
}
```

FIG. 90

```
// example module_def1754...

// example includes1494...
#include "Set.h"

// class forward declarations...
class mscanFile1810;
  class mscanDirectory1812;
    class mscanTopDirectory1814;
  class mscanRegularFile1816;
    class mscanAudioFile1818;
    class mscanVideoFile1820;

class mscanHost1806;
class mscanViewer1808;

// example typedefs1496...
typedef Set<mscanFile*> mscanFileSet;

// example host_def1766...
class mscanHost1806 {
private: // member definitions...
  // example datum_def1552...
  mscanFileSet _root_files1822;
public: // member access...
  // example edit_access_defs1572...
  mscanFileSet& root_files() {return _root_files1822;}
  // example view_access_defs1564...
  const mscanFileSet& root_files() const {return _root_files1822;}
public: // factory...
  mscanHost1806() {}
  virtual ~mscanHost1806() {
    // example cleanups1698...
    // example cleanup1556
    /* delete _root_files1822 contents */
  }
};
```

*FIG. 91*

```
// example cat_defs1764...
// example cat_def1672...
class mscanFile1810 {
private:
   // example datum_def1552...
   mscanDirectory* _parent1824;
   Text _name1826;
public:
   // example edit_access_defs1572...
   mscanDirectory *parent() {return _parent1824;}
   // example view_access_defs1564...
   const mscanDirectory *parent() const {return _parent1824;}
   Text name() const {return _name1826;}
   // example reset_access_defs1568...
   void set_parent(mscanDirectory *t) {_parent1824 = t;}
   void set_name(Text t) {_name1826 = t;}
public:
   // example view_dispatch1688...
   virtual bool dispatch_view(mscanViewer1808 &v) const {return v.view(this);}
public:
   mscanFile1810() : _parent1824(0) {}
      // ...example initializer1554
      // ...example initializers1696
   virtual ~mscanFile1810() {}
};

// example cat_def1672...
class mscanDirectory1812 : public mscanFile1810 {
private: // example datum_defs1682...
   mscanFileSet _files1828;
public:
   // example edit_access_defs1572...
   mscanFileSet& files() {return _files1828;}
   // example view_access_defs1564...
   const mscanFileSet& files() const {return _files1828;}
public:
   // example view_dispatch1688...
   virtual bool dispatch_view(mscanViewer1808 &v) const {return v.view(this);}
public:
   mscanDirectory1812() {}
   virtual ~mscanDirectory1812 {
      // example cleanups1698...
      // example cleanup1556...
      /* delete _files1828 contents */
   }
};
```

FIG. 92

```
// example viewer¹⁷⁵⁶...
class mscanViewer¹⁸⁰⁸ {
public: // example class_views¹⁷⁵⁸...
  // example class_view¹⁶⁷⁴...
  virtual bool view(const mscanFile¹⁸¹⁰* x) {
    return view_merons(x) && view_base(x);
  }
  // example class_view¹⁶⁷⁴...
  virtual bool view(const mscanDirectory¹⁸¹²* x) {
    return view_merons(x) && view_base(x);
  }
  // ...
public:
  bool view_merons(const mscanFile¹⁸¹⁰* x) {return 1;}
  bool view_merons(const mscanDirectory¹⁸¹²* x) {
    // example meron_view_dispatches¹⁶⁷⁸...
    // example meron_view_dispatch¹⁵⁵⁸...
    return view_agg(x->files());
  }
  // ...
public:
  bool view_base(const mscanFile¹⁸¹⁰* x) {return 1;}
  bool view_base(const mscanDirectory¹⁸¹²* x) {
    // example base_view_dispatches¹⁶⁸⁶...
    return x->mscanFile¹⁸¹⁰::dispatch_view(*this);
  }
  // ...
public:
  bool view_agg(const mscanFileSet& a) {
    foreach(u in a) if (!u->dispatch_view(*this)) return 0;
    return 1;
  }
};
```

PROCESSING A MODULE SPECIFICATION TO PRODUCE A MODULE DEFINITION

CROSS-REFERENCE TO RELATED APPLICATIONS

This application claims the benefit of PPA Ser. No. 60/791,128, Module Generation for Object-Oriented Programming, filed Apr. 11, 2006 by the present inventor, the disclosure of which is incorporated herein by reference.

BACKGROUND OF THE INVENTION

This invention relates particularly to the production of module definitions from module specifications, and generally to software development tools generating object-oriented programming language code.

Object-oriented programming enjoys great popularity among programmers. However, in the development of a complex system, the programmer must attend to a vast collection of details. These details may easily obscure and complicate large-scale considerations of the interactions within and between program elements. Hence it would be beneficial to have the use of tools which reduce complexity by automatically handling various details, which may then be suppressed in favor of concise expressions of large-scale interactions.

Object-oriented programming tends to focus on classes, since classes are the most important component in object-oriented programming languages. In many applications, however, significant benefits may be gained by considering modules, which include collections of interrelated classes. Modules typically incorporate classes which are closely related to domain-specific categories. Relationships of generalizations and specialization among domain categories may be reflected in derivation relationships between categorical classes. It would be beneficial for modules to also include non-categorical classes which are specialized for hosting and processing data structures composed of instances from the categorical classes. It would also be beneficial to coordinate and systematize categorical and unitary non-categorical classes to enhance developer productivity, further relieving the developer from excessive attention to tedious details.

The problems of specifying suitable representations have led to enormous efforts in the provision of modeling languages, of which the most prominent may be the Unified Modeling Language (UML). UML is vast and, comprehensive, with a scope that encompasses all aspects of object-oriented programming. The breadth of that scope limits the use of idioms, patterns, and other paradigms that are applicable in a narrower context of specific unitary and categorical classes. It would be beneficial to have methods of processing that were specifically directed to the narrower but still critical problems of the specification, construction, and processing of domain-specific object-oriented data structures.

SUMMARY

A computer-implemented method of processing a module specification to produce a module definition is disclosed. A module is viewed. The module is included in the module specification. A plurality of categorical classes are dispatched. The categorical classes are included in the module. A plurality of class view definitions are accumulated to a viewer class definition. The viewer class definition is included in the module definition.

A categorical class is viewed. The categorical class is included in the categorical classes. The categorical class may be associated with one or more genus classes. A plurality of class members are dispatched. The class members are included in the categorical class. A datum is viewed. The datum is included in the class members. A datum definition is written. The datum definition is accumulated to a plurality of member data definitions.

According to a test for a meron qualification in the datum, a member meron view dispatch operation is written. The member view meron dispatch, if any, is accumulated to a plurality of meron view dispatch operations. The meron view dispatch operations are accumulated to a class view definition. The member data definitions are accumulated to a categorical class definition.

A genus class is iterated over each of the genus classes, if any. A base class view dispatch operation is written using the genus class. The base class view dispatch operation is accumulated to a plurality of base class view dispatch operations. The base class view dispatch operations, if any, are accumulated to the class view definition.

A view dispatch is written. The view dispatch is accumulated to the categorical class definition. The categorical class definition is accumulated to a plurality of categorical class definitions. The categorical class definitions are included in the module definition. The class view definition is accumulated to the class view definitions.

BRIEF DESCRIPTION OF DRAWINGS

FIG. 1 depicts a generator which reads module specifications and writes programming language code and documentation corresponding to the specifications.

FIG. 2 begins the depiction of a summary specification of an exemplary object-oriented module suitable for representation of specifications of object-oriented modules (1/2).

FIG. 3 concludes the depiction of a summary specification of an exemplary object-oriented module suitable for representation of specifications of object-oriented modules (2/2).

FIG. 4 depicts a skeletal definition of an exemplary viewer class suitable as a base class for specialization to process a data structure representative of specifications of object-oriented modules.

FIG. 5 depicts an informal definition of an exemplary class representing entity elements.

FIG. 6 depicts a segment of a viewer base class pertaining to instances of the entity.

FIG. 7 depicts an informal definition of an exemplary class representing module elements.

FIG. 8 depicts a segment of a viewer base class pertaining to instances of the module.

FIG. 9 depicts an informal definition of an exemplary class representing class elements.

FIG. 10 depicts a segment of a viewer base class pertaining to instances of the class.

FIG. 11 depicts an informal definition of an exemplary class representing host-class elements.

FIG. 12 depicts a segment of a viewer base class pertaining to instances of the host-class.

FIG. 13 depicts an informal definition of an exemplary class representing operand elements.

FIG. 14 depicts a segment of a viewer base class pertaining to instances of the operand.

FIG. 15 depicts an informal definition of an exemplary class representing member elements.

FIG. 16 depicts a segment of a viewer base class pertaining to instances of the member.

FIG. 17 depicts an informal definition of an exemplary class representing member-datum elements.

FIG. 18 depicts a segment of a viewer base class pertaining to instances of the member-datum.

FIG. 19 depicts an informal definition of an exemplary class representing type elements.

FIG. 20 depicts a segment of a viewer base class pertaining to instances of the type.

FIG. 21 depicts an informal definition of an exemplary class representing value-type elements.

FIG. 22 depicts a segment of a viewer base class pertaining to instances of the value-type.

FIG. 23 depicts an informal definition of an exemplary class representing bit-type elements.

FIG. 24 depicts a segment of a viewer base class pertaining to instances of the bit-type.

FIG. 25 depicts an informal definition of an exemplary class representing text-type elements.

FIG. 26 depicts a segment of a viewer base class pertaining to instances of the text-type.

FIG. 27 depicts an informal definition of an exemplary class representing reference-type elements.

FIG. 28 depicts a segment of a viewer base class pertaining to instances of the reference-type.

FIG. 29 depicts an informal definition of an exemplary class representing compound-type elements.

FIG. 30 depicts a segment of a viewer base class pertaining to instances of the compound-type.

FIG. 31 depicts an informal definition of an exemplary class representing sequence-type elements.

FIG. 32 depicts a segment of a viewer base class pertaining to instances of the sequence-type.

FIG. 33 depicts an informal definition of an exemplary class representing value-sequence-type elements.

FIG. 34 depicts a segment of a viewer base class pertaining to instances of the value-sequence-type.

FIG. 35 depicts an informal definition of an exemplary class representing reference-sequence-type elements.

FIG. 36 depicts a segment of a viewer base class pertaining to instances of the reference-sequence-type.

FIG. 37 depicts an informal definition of an exemplary class representing set-type elements.

FIG. 38 depicts a segment of a viewer base class pertaining to instances of the set-type.

FIG. 39 depicts an informal definition of an exemplary class representing value-set-type elements.

FIG. 40 depicts a segment of a viewer base class pertaining to instances of the value-set-type.

FIG. 41 depicts an informal definition of an exemplary class representing reference-set-type elements.

FIG. 42 depicts a segment of a viewer base class pertaining to instances of the reference-set-type.

FIG. 43 depicts an informal definition of an exemplary class representing map-type elements.

FIG. 44 depicts a segment of a viewer base class pertaining to instances of the map-type.

FIG. 45 depicts an informal definition of an exemplary class representing index-map-type elements.

FIG. 46 depicts a segment of a viewer base class pertaining to instances of the index-map-type.

FIG. 47 depicts an informal definition of an exemplary class representing scale-map-type elements.

FIG. 48 depicts a segment of a viewer base class pertaining to instances of the scale-map-type.

FIG. 49 depicts an informal definition of an exemplary class representing bind-map-type elements.

FIG. 50 depicts a segment of a viewer base class pertaining to instances of the bind-map-type.

FIG. 51 depicts an informal definition of an exemplary class representing convert-map-type elements.

FIG. 52 depicts a segment of a viewer base class pertaining to instances of the convert-map-type.

FIG. 53 depicts an informal definition of an exemplary class suitable for type definer operations.

FIG. 54 depicts an exemplary informal definition of a type definer member function type-entry.

FIG. 55 depicts an exemplary informal definition of a type definer member function view-bit-type.

FIG. 56 depicts an exemplary informal definition of a type definer member function view-text-type.

FIG. 57 depicts an exemplary informal definition of a type definer member function view-reference-type.

FIG. 58 depicts an exemplary informal definition of a type definer member function view-compound-type.

FIG. 59 depicts an exemplary informal definition of a type definer member function view-sequence-type.

FIG. 60 depicts an exemplary informal definition of a type definer member function view-reference-sequence-type.

FIG. 61 depicts an exemplary informal definition of a type definer member function view-value-sequence-type.

FIG. 62 depicts an exemplary informal definition of a type definer member function view-set-type.

FIG. 63 depicts an exemplary informal definition of a type definer member function view-reference-set-type.

FIG. 64 depicts an exemplary informal definition of a type definer member function view-value-set-type.

FIG. 65 depicts an exemplary informal definition of a type definer member function view-map-type.

FIG. 66 depicts an exemplary informal definition of a type definer member function view-index-map-type.

FIG. 67 depicts an exemplary informal definition of a type definer member function view-scale-map-type.

FIG. 68 depicts an exemplary informal definition of a type definer member function view-bind-map-type.

FIG. 69 depicts an exemplary informal definition of a type definer member function view-convert-map-type.

FIG. 70 depicts an informal definition of an exemplary class suitable for forwards writer operations.

FIG. 71 depicts an exemplary informal definition of a forwards writer member function module-entry.

FIG. 72 depicts an exemplary informal definition of a forwards writer member function view-class.

FIG. 73 depicts an exemplary informal definition of a forwards writer member function view-member-datum.

FIG. 74 depicts an exemplary informal definition of a forwards writer member function view-host-class.

FIG. 75 depicts an informal definition of an exemplary class suitable for member datum writer operations.

FIG. 76 depicts an exemplary informal definition of a member datum writer member function member-datum-entry.

FIG. 77 depicts an exemplary informal definition of a member datum writer member function view-value-type.

FIG. 78 depicts an exemplary informal definition of a member datum writer member function view-reference-type.

FIG. 79 depicts an exemplary informal definition of a member datum writer member function view-compound-type.

FIG. 80 depicts an exemplary informal definition of a member datum writer member function view-reference-sequence-type.

FIG. 81 depicts an exemplary informal definition of a member datum writer member function view-reference-set-type.

FIG. 82 depicts an informal definition of an exemplary class suitable for class writer operations.

FIG. 83 depicts an exemplary informal definition of a class writer member function class-entry.

FIG. 84 depicts an exemplary informal definition of a class writer member function view-member-datum.

FIG. 85 depicts an informal definition of an exemplary class suitable for module writer operations.

FIG. 86 depicts an exemplary informal definition of a module writer member function module-entry.

FIG. 87 depicts an exemplary informal definition of a module writer member function view-class.

FIG. 88 depicts an exemplary informal definition of a module writer member function view-host-class.

FIG. 89 depicts an exemplary module specification for an object-oriented module suitable for representation of media files in a file system.

FIG. 90 depicts an exemplary module definition for an object-oriented module suitable for representation of media files in a file system (1/3).

FIG. 91 continues the depiction of an exemplary module definition for an object-oriented module suitable for representation of media files in a file system (2/3).

FIG. 92 concludes the depiction of an exemplary module definition for an object-oriented module suitable for representation of media files in a file system (3/3).

DETAILED DESCRIPTION

1 Terminology

The present invention concerns the generation of module definitions from module specifications. For the purposes of this invention, a module definition is a collection of interrelated object-oriented class definitions and other elements of an object-oriented computer program. A module specification is an object-oriented data structure typically derived from a textual expression prepared by a human programmer or a computer program. The module specification represents the classes and other elements that will be defined in the module definition.

Classes may be usefully divided into categorical classes and unitary classes. A categorical class corresponds to a category in a domain-specific model. Thus categorical classes are largely determined by the requirements of the domain to which applications of the specified module are directed. Instances of a categorical class are typically unbounded in number. Categorical classes are usually arranged in a hierarchy or directed acyclic graph reflecting the relations of genera and species among the domain-specific categories.

Unitary classes relate to the module as a whole. A host is one important unitary class. The host for a module provides a unitary representation of what is typically a multiplicity of objects. The objects are instances of the categorical classes. The host provides access to individual and collected instances according to an organizational scheme which reflects the requirements of the domain. Together with the categorical instances, the host provides a domain-specific object-oriented data structure which is convenient as a target for construction and as a source for processing.

Another useful unitary class is the viewer. A viewer implements a variation of the well-known visitor pattern to provide convenient access to a domain-specific object-oriented data structure including a host and its categorical instances. The viewer is a collection of handlers, each of which is a member function accepting a categorical instance as its argument. The module definitions include a definition of a base viewer, the behavior of which is determined according to the module specification. An application typically includes one or more specializations of the viewer, derived from the base viewer, with specializations of handlers as necessary to carry out the application tasks.

The editor is a unitary class similar in structure to the viewer. However, the handlers of a viewer may not modify the data structure, which the editor handlers are permitted make modifications. In visitor contexts corresponding to specialized viewers and editors, dispatch of categorical instances is a useful operation. In dispatching an instance, a virtual member function of the instance is invoked, which in turn invokes a corresponding handler in the visitor. The usefulness arises from the virtuality of the dispatch. The dispatcher may be holding a generic element, but the virtual dispatch will be directed to a specific implementation and hence handler, since specific categorical classes specialize the generic dispatch. This subtle and powerful behavior serves as an organizing principle for computation with visitors. Variations include dispatch to base classes (in which dispatches to the base class handlers is provided), dispatch to merons (i.e. designated meronymic constituents of an instance, described below), and dispatch to aggregates (collections of elements, often heterogeneous relative to a common genus).

Specializations of the viewer or editor are denoted operants. Operants may use default traversal patterns of their base visitors or specialized traversal to suit particular requirements. Often a combination of default and specialized traversal is most useful. Operants may use member data to conveniently accumulate processing products or to represent important state in an ongoing computation. Operants may delegate to subsidiary operants to partition a computation into convenient segments, with suitable processing state at each level.

The categorical classes of a module, corresponding to the categories of a domain, are characterized by member data. The form of the member data is specified in the class but each instance has its own copy of member data elements. Member data is characterized by its type. Type is a complex property of data in many object-oriented programming languages. In the present invention, a simplified type system is used, permitting concise specification and enforcing consistency of usage. Types include value types, reference types, and compound types.

Value types correspond to scalar data, in which the value of the data accords with the meaning of the data. Scalar data is typically represented by built-in types of a programming language (e.g. int, double, char, in the C language) or by simple classes (e.g. string, date) which may be passed by value (copying elements or structures). Scalar data is used to represent properties of instances, such as identifiers and measured quantities.

Reference types correspond to references to instances of categories. Reference data is typically represented by pointers or references in a programming language. The value of a pointer is arbitrary and bears no relation to the meaning of the object the pointer represents. Reference data is typically passed by reference (i.e. by copying pointers, not structures). Conceptually, reference data is used to implement associations among categories in which a first instance is associated with a second instance.

Compound types correspond to collections. Provision of collections varies widely in programming languages. However, for effective application programming, set, sequence, and map may be sufficient. A set is an unordered collection of elements which does not contain duplicates. A set provides efficient determination of the presence or absence of an element. A set also provide efficient insertion and deletion of an element. Efficient iteration of the constituent elements of a set is another requirement. Efficient in this context means logarithmic in the number of contained elements for determination, insertion, and deletion. Sets may contain reference or value data.

A sequence is an ordered collection which provides efficient insertion and deletion of elements at either end of the sequence, thus permitting stack, queue, and deque functionality. A sequence may also provide efficient random access to individual elements by offset in the collection order. A sequence also provides efficient iteration of the elements in order. Sequences may contain reference or value data.

A map provides efficient association between domain and range elements. Given a domain element, a map efficiently produces a corresponding range element or indicates the absence of such an element. Maps must efficiently support insertion and deletion of domain, range pairs. Maps support all combinations of range and domain value and reference. An index denotes a map with a value domain and a reference range. A scale denotes a map with a reference domain and a value range. A binding denotes a map with reference domain and range. A conversion denotes a map with value domain and range.

Member data having singular or compound reference type may be characterized by a meron qualification. Qualification as a meron indicates that the referenced element should be considered a part of the referencing element. The term is a contraction of the linguistic term "meronym", which is used to distinguish a part in a part/whole relationship. Used in a module specification, meron qualification determines memory management, where applicable, as well as default behavior in the base viewer and the base editor. In the default view of an instance, its merons will be viewed. Non-meron references are ignored by default.

2 Overview

Refer to FIG. 1. A generator 1000 processes a synthetic-language specification 1002 to produce generated-code 1004 and generated-documents 1006. The specification 1002 is processed by a parser 1008, which constructs an object-oriented data structure encapsulated in a host 1010. The host 1010 represents the modules specified in the specification 1002. The constituent module specifications of the host 1010 are processed by a code-generator 1012 to provide the generated-code 1004. The generated code includes software components written in a conventional object-oriented programming language. The constituent module specifications of the host 1010 are also processed by a document-generator 1014 to provide the generated-documents 1006. The generated documentation includes descriptions and figures which characterize the modules specified in the specification 1002.

The present invention relates to the processing of the constituent module specifications of the host 1010 by the code-generator 1012 to produce the generated-code 1004. Co-pending applications relate to the language of the specification 1002, the parser 1008, and the document-generator 1014.

A module specification is represented as an object-oriented data structure, the elements of which are instances of classes representative of domain-specific elements, such as modules, classes, members, types, etc. The domain-specific classes themselves form a module specialized for the representation of modules, hence, a meta-module. The categorical classes and the viewer for the meta-module are described.

A module specification is processed to produce module definition. The module definition is textual, consisting of programming language code. The processing of the module specification is mediated by several operants, which are specializations of the meta-module viewer. Operants include a module writer, a class writer, a datum writer, and a type definer. These operants are described.

An example of a module specification and parts of its corresponding module definition is exhibited. The example module provides a representation for files in a hierarchical file system. Finally, alternative embodiments are considered.

In the exemplary embodiments of the invention exhibited here, many syntactic elements are omitted to enhance clarity and to conform to space limitations. These omissions are intended to highlight the novel and non-obvious aspects of the invention by suppression of unimportant details. The provision of these missing elements would not present any difficulty for one skilled in the art of object-oriented programming.

3 Meta Module Discursive Model

Refer to FIG. 2. The meta-module 1016 specifies classes for representation and processing of modules for object-oriented programming. The meta-module 1016 has a viewer class meta-module-viewer 1018. The meta-module-viewer 1018 provides a viewer base class for the meta-module 1016 with useful defaults and service methods from which specialized view operants may be derived.

A categorical class entity 1020 represents named elements. A datum id 1022 uniquely identifies a particular entity in a global scope.

A categorical class module 1024 represents a collection of interrelated classes for object-oriented programming. The module 1024 has genus entity 1020. A datum classes 1026 represents the collection of classes within a module. The classes 1026 is a meron. A datum host 1028 represents a class, an instance of which encapsulates an application-specific object-oriented data structure corresponding to an instantiation of a module. The host 1028 is a meron. A datum viewer-id 1030 specifies a view operator to be generated; the generated viewer provides a useful base class for read-only operators that process an instantiation of a module. A datum editor-id 1032 specifies an edit operator to be generated; the generated editor provides a useful base class for write-capable operators that process an instantiation of a module.

A categorical class class 1034 represents a class for object-oriented programming. The class 1034 has genus entity 1020. A datum genera 1036 represents the collection of classes from which a particular class is derived. A datum members 1038 represents the members of a particular class. The members 1038 is a meron.

A categorical class host-class 1040 represents an instantiation of a module. The host-class 1040 has genus class 1034.

A categorical class operand 1042 represents a typed entity in a scope. The operand 1042 has genus entity 1020. A datum scope-id 1044 uniquely identifies an operand in a scope. A datum type 1046 specifies the type of an operand.

A categorical class member 1048 represents a member in a class. The member 1048 has genus operand 1042.

A categorical class member-datum 1050 represents a member datum in a class. The member-datum 1050 has genus member 1048. A datum is-meron 1052 indicates that a member datum is a meronym of the containing instance of the class to which it belongs.

Refer to FIG. 3. A categorical class type 1054 characterizes the typing of an operand.

A categorical class value-type 1056 characterizes a type which is passed by value. The value-type 1056 has genus type 1054.

A categorical class bit-type 1058 represents a Boolean value, true or false. The bit-type 1058 has genus value-type 1056.

A categorical class text-type 1060 represents a textual value. The text-type 1060 has genus value-type 1056.

A categorical class reference-type 1062 characterizes a type which is passed by reference. The reference-type 1062 has genus type 1054. A datum reference-class-id 1064 identifies the class to which a reference type corresponds.

A categorical class compound-type 1066 characterizes a type which corresponds to a collection. The compound-type 1066 has genus type 1054. A datum range 1068 specifies the characteristic subsidiary type of the elements in the compound type.

A categorical class sequence-type 1070 characterizes a sequence of elements. The sequence-type 1070 has genus compound-type 1066.

A categorical class value-sequence-type 1072 characterizes a sequence of value-typed elements. The value-sequence-type 1072 has genus sequence-type 1070.

A categorical class reference-sequence-type 1074 characterizes a sequence of reference-typed elements. The reference-sequence-type 1074 has genus sequence-type 1070.

A categorical class set-type 1076 characterizes a set of elements. The set-type 1076 has genus compound-type 1066.

A categorical class value-set-type 1078 characterizes a set of value-typed elements. The value-set-type 1078 has genus set-type 1076.

A categorical class reference-set-type 1080 characterizes a set of reference-typed elements. The reference-set-type 1080 has genus set-type 1076.

A categorical class map-type 1082 characterizes a map associating pairs of elements. The map-type 1082 has genus compound-type 1066. A datum domain 1084 specifies the subsidiary type of the domain elements.

A categorical class index-map-type 1086 characterizes a map, of which the range elements are of reference type and the domain elements are of value type. The index-map-type 1086 has genus map-type 1082.

A categorical class scale-map-type 1088 characterizes a map, of which the range elements are of value type and the domain elements are of reference type. The scale-map-type 1088 has genus map-type 1082.

A categorical class bind-map-type 1090 characterizes a map, of which both the range and domain elements are of reference type. The bind-map-type 1090 has genus map-type 1082.

A categorical class convert-map-type 1092 characterizes a map, of which both the range and domain elements are of value type. The convert-map-type 1092 has genus map-type 1082.

3.1 Meta Module Viewer Viewer Class

Refer to FIG. 4. The meta-module-viewer 1018 provides a viewer base class for the meta-module 1016 with useful defaults and service methods from which specialized view operants may be derived. A segment class-views 1094 specifies a collection of virtual methods of the meta-module-viewer 1018, each of which accepts an instance of a particular discursant for read-only processing. The class-views 1094 provides a default implementation which views the merons of the instance and delegates processing to the view(s) of the instance's base class(es). A segment meron-view-dispatches 1096 specifies a collection of methods of the meta-module-viewer 1018, each of which accepts an instance of a particular discursant for read-only processing of merons of the instance, if any. A segment base-view-dispatches 1098 specifies a collection of methods of the meta-module-viewer 1018, each of which accepts an instance of a particular category for read-only processing and delegates processing to view implementations corresponding to the base class(es) of the instance, if any. A segment aggregate-view-dispatches 1100 specifies a collection of methods of the meta-module-viewer 1018, each of which accepts a collection of instances of a particular category for read-only processing, dispatching processing to each instance of the collection.

A datum failed 1102 signifies that the viewer has failed. The failed 1102 is initialized to false, indicating that the viewer has not yet failed. The failed 1102 is shown public for ease of exposition; in an alternative embodiment, the failed 1102 could be private, with read access via a const method, and write access mediated by a method fail 1104. The fail 1104 encapsulates error reporting and failure indication. The fail 1104 accepts a textual argument which may provide a basis for an error report. The fail 1104 sets the failed 1102, indicating failure. The fail 1104 returns zero, indicating failure, for convenience in invocation in handlers, which have a boolean return value.

3.2 Categorical Classes 3.2.1 Entity Categorical Class

Refer to FIG. 5. The entity 1020 represents named elements. The entity 1020 is a root-level class of the meta-module 1016. The id 1022 uniquely identifies a particular entity in a global scope. The id 1022 is required. The id 1022 ranges over scalar text. The id 1022 has singleton arity. A method dispatch-view 1106 specifies a virtual member function which specializes a generic view dispatch to the specific view corresponding to the entity 1020.

Refer to FIG. 6, which depicts a segment of the meta-module-viewer 1018 corresponding to the entity 1020. A method view 1108 provides a default implementation for an operant handler processing instances of the entity 1020. The view 1108 delegates processing to merons and view handlers for base classes, if any. Processing of merons is delegated to a method view-merons 1110. Processing by base handlers is delegated to a method view-base 1112. The view 1108 is a constituent of the class-views 1094. The view-base 1112 delegates view dispatch to the base classes, if any, for an operant handler processing instances of the entity 1020. The view-base 1112 is a constituent of the base-view-dispatches 1098. The view-merons 1110 delegates view dispatches to the constituent meron members, if any, for an operant handler processing instances of the entity 1020. The entity 1020 lacks any merons, so the view-merons 1110 is trivially successful. The view-merons 1110 is a constituent of the meron-view-dispatches 1096.

3.2.2 Module Categorical Class

Refer to FIG. 7. The module 1024 represents a collection of interrelated classes for object-oriented programming. The module 1024 has genus entity 1020. The classes 1026 represents the collection of classes within a module. The classes 1026 ranges over instances of the class class 1034. The classes 1026 is a meron. The classes 1026 has sequence arity. The host 1028 represents a class, an instance of which encapsulates an application-specific object-oriented data structure corresponding to an instantiation of a module. The host 1028 is the target for module-scoped member specifications. The host 1028 instance may be denoted as a model object or a document object. The host 1028 may contain resolver, depository, factory, reflector, etc. according to specification. The host 1028 ranges over instances of the class host-class 1040. The host 1028 is a meron. The host 1028 has singleton arity. The viewer-id 1030 specifies a view operator to be generated; the generated viewer provides a useful base class for read-only operators that process an instantiation of a module. The viewer-id 1030 ranges over scalar text. The viewer-id 1030 has singleton arity. The editor-id 1032 specifies an edit operator to be generated; the generated editor provides a useful base class for write-capable operators that process an instantiation of a module. The editor-id 1032 ranges over scalar text. The editor-id 1032 has singleton arity. A method dispatch-view 1114 specifies a virtual member function which specializes a generic view dispatch to the specific view corresponding to the module 1024.

Refer to FIG. 8, which depicts a segment of the meta-module-viewer 1018 corresponding to the module 1024. A method view 1116 provides a default implementation for an operant handler processing instances of the module 1024. The view 1116 delegates processing to merons and view handlers for base classes, if any. Processing of merons is delegated to a method view-merons 1118. Processing by base handlers is delegated to a method view-base 1120. The view 1116 is a constituent of the class-views 1094. The view-base 1120 delegates view dispatch to the base classes, if any, for an operant handler processing instances of the module 1024. The view-base 1120 is a constituent of the base-view-dispatches 1098. The view-merons 1118 delegates view dispatches to the constituent meron members, if any, for an operant handler processing instances of the module 1024. The view 1116 dispatches an aggregate view to the classes 1026, a sequence of instances of the class 1034, making use of a method view-class-sequence 1122. The view-merons 1118 is a constituent of the meron-view-dispatches 1096. The view-class-sequence 1122 dispatches a view to each constituent of the supplied sequence of instances of the class 1034. The view-class-sequence 1122 is supplied with a sequence of instances of the class 1034. The view dispatch to each constituent instance of the class 1034 makes use of the dispatch-view 1124. The view-class-sequence 1122 is a constituent of the aggregate-view-dispatches 1100.

3.2.3 Class Categorical Class

Refer to FIG. 9. The class 1034 represents a class for object-oriented programming. The class 1034 has genus entity 1020. The genera 1036 represents the collection of classes from which a particular class is derived. The genera 1036 includes the closest generalizations of a particular class. The genera 1036 ranges over instances of the class class 1034. The genera 1036 has sequence arity. The members 1038 represents the members of a particular class. The members 1038 may include data members and function members. The members 1038 ranges over instances of the class member 1048. The members 1038 is a meron. The members 1038 has sequence arity. A method dispatch-view 1124 specifies a virtual member function which specializes a generic view dispatch to the specific view corresponding to the class 1034.

Refer to FIG. 10, which depicts a segment of the meta-module-viewer 1018 corresponding to the class 1034. A method view 1126 provides a default implementation for an operant handler processing instances of the class 1034. The view 1126 delegates processing to merons and view handlers for base classes, if any. Processing of merons is delegated to a method view-merons 1128. Processing by base handlers is delegated to a method view-base 1130. The view 1126 is a constituent of the class-views 1094. The view-base 1130 delegates view dispatch to the base classes, if any, for an operant handler processing instances of the class 1034. The view-base 1130 is a constituent of the base-view-dispatches 1098. The view-merons 1128 delegates view dispatches to the constituent meron members, if any, for an operant handler processing instances of the class 1034. The view 1126 dispatches an aggregate view to the members 1038, a sequence of instances of the member 1048, making use of a method view-member-sequence 1132. The view-merons 1128 is a constituent of the meron-view-dispatches 1096. The view-member-sequence 1132 dispatches a view to each constituent of the supplied sequence of instances of the member 1048. The view-member-sequence 1132 is supplied with a sequence of instances of the member 1048. The view dispatch to each constituent instance of the member 1048 makes use of the dispatch-view 1134. The view-member-sequence 1132 is a constituent of the aggregate-view-dispatches 1100.

3.2.4 Host Class Categorical Class

Refer to FIG. 11. The host-class 1040 represents an instantiation of a module. The host-class 1040 represents the totality of an application-specific object-oriented data structure. The host-class 1040 corresponds to the host 1028. The host-class 1040 typically occurs in a singleton instance per application. The host-class 1040 provides a useful target for parsing, markup, etc. The host-class 1040 has genus class 1034. A method dispatch-view 1136 specifies a virtual member function which specializes a generic view dispatch to the specific view corresponding to the host-class 1040.

Refer to FIG. 12, which depicts a segment of the meta-module-viewer 1018 corresponding to the host-class 1040. A method view 1138 provides a default implementation for an operant handler processing instances of the host-class 1040. The view 1138 delegates processing to merons and view handlers for base classes, if any. Processing of merons is delegated to a method view-merons 1140. Processing by base handlers is delegated to a method view-base 1142. The view 1138 is a constituent of the class-views 1094. The view-base 1142 delegates view dispatch to the base classes, if any, for an operant handler processing instances of the host-class 1040. The view-base 1142 is a constituent of the base-view-dispatches 1098. The view-merons 1140 delegates view dispatches to the constituent meron members, if any, for an operant handler processing instances of the host-class 1040. The host-class 1040 lacks any merons, so the view-merons 1140 is trivially successful. The view-merons 1140 is a constituent of the meron-view-dispatches 1096.

3.2.5 Operand Categorical Class

Refer to FIG. 13. The operand 1042 represents a typed entity in a scope. The operand 1042 has genus entity 1020. The scope-id 1044 uniquely identifies an operand in a scope. The scope-id 1044 is applicable to members in a class scope and arguments in a member function scope. The scope-id 1044 ranges over scalar text. The scope-id 1044 has singleton arity. The type 1046 specifies the type of an operand. The type 1046 ranges over instances of the class type 1054. The type 1046 has singleton arity. A method dispatch-view 1144 specifies a virtual member function which specializes a generic view dispatch to the specific view corresponding to the operand 1042.

Refer to FIG. 14, which depicts a segment of the meta-module-viewer 1018 corresponding to the operand 1042. A method view 1146 provides a default implementation for an operant handler processing instances of the operand 1042. The view 1146 delegates processing to merons and view handlers for base classes, if any. Processing of merons is delegated to a method view-merons 1148. Processing by base handlers is delegated to a method view-base 1150. The view 1146 is a constituent of the class-views 1094. The view-base 1150 delegates view dispatch to the base classes, if any, for an operant handler processing instances of the operand 1042. The view-base 1150 is a constituent of the base-view-dispatches 1098. The view-merons 1148 delegates view dispatches to the constituent meron members, if any, for an operant handler processing instances of the operand 1042. The operand 1042 lacks any merons, so the view-merons 1148 is trivially successful. The view-merons 1148 is a constituent of the meron-view-dispatches 1096.

3.2.6 Member Categorical Class

Refer to FIG. 15. The member 1048 represents a member in a class. The member 1048 has genus operand 1042. A method dispatch-view 1134 specifies a virtual member function which specializes a generic view dispatch to the specific view corresponding to the member 1048.

Refer to FIG. 16, which depicts a segment of the meta-module-viewer 1018 corresponding to the member 1048. A method view 1152 provides a default implementation for an operant handler processing instances of the member 1048. The view 1152 delegates processing to merons and view handlers for base classes, if any. Processing of merons is delegated to a method view-merons 1154. Processing by base handlers is delegated to a method view-base 1156. The view 1152 is a constituent of the class-views 1094. The view-base 1156 delegates view dispatch to the base classes, if any, for an operant handler processing instances of the member 1048. The view-base 1156 is a constituent of the base-view-dispatches 1098. The view-merons 1154 delegates view dispatches to the constituent meron members, if any, for an operant handler processing instances of the member 1048. The member 1048 lacks any merons, so the view-merons 1154 is trivially successful. The view-merons 1154 is a constituent of the meron-view-dispatches 1096.

3.2.7 Member Datum Categorical Class

Refer to FIG. 17. The member-datum 1050 represents a member datum in a class. The member-datum 1050 has genus member 1048. The is-meron 1052 indicates that a member datum is a meronym of the containing instance of the class to which it belongs. The is-meron 1052 indicates that the member datum is to be deleted on deletion of the containing instance. The is-meron 1052 indicates that, by default, viewers and editors of the module should recursively visit the member datum when visiting the containing instance. The is-meron 1052 ranges over scalar boolean. The is-meron 1052 has singleton arity. A method dispatch-view 1158 specifies a virtual member function which specializes a generic view dispatch to the specific view corresponding to the member-datum 1050.

Refer to FIG. 18, which depicts a segment of the meta-module-viewer 1018 corresponding to the member-datum 1050. A method view 1160 provides a default implementation for an operant handler processing instances of the member-datum 1050. The view 1160 delegates processing to merons and view handlers for base classes, if any. Processing of merons is delegated to a method view-merons 1162. Processing by base handlers is delegated to a method view-base 1164. The view 1160 is a constituent of the class-views 1094. The view-base 1164 delegates view dispatch to the base classes, if any, for an operant handler processing instances of the member-datum 1050. The view-base 1164 is a constituent of the base-view-dispatches 1098. The view-merons 1162 delegates view dispatches to the constituent meron members, if any, for an operant handler processing instances of the member-datum 1050. The member-datum 1050 lacks any merons, so the view-merons 1162 is trivially successful. The view-merons 1162 is a constituent of the meron-view-dispatches 1096.

3.2.8 Type Categorical Class

Refer to FIG. 19. The type 1054 characterizes the typing of an operand. The type 1054 is a root-level class of the meta-module 1016. A method dispatch-view 1166 specifies a virtual member function which specializes a generic view dispatch to the specific view corresponding to the type 1054.

Refer to FIG. 20, which depicts a segment of the meta-module-viewer 1018 corresponding to the type 1054. A method view 1168 provides a default implementation for an operant handler processing instances of the type 1054. The view 1168 delegates processing to merons and view handlers for base classes, if any. Processing of merons is delegated to a method view-merons 1170. Processing by base handlers is delegated to a method view-base 1172. The view 1168 is a constituent of the class-views 1094. The view-base 1172 delegates view dispatch to the base classes, if any, for an operant handler processing instances of the type 1054. The view-base 1172 is a constituent of the base-view-dispatches 1098. The view-merons 1170 delegates view dispatches to the constituent meron members, if any, for an operant handler processing instances of the type 1054. The type 1054 lacks any merons, so the view-merons 1170 is trivially successful. The view-merons 1170 is a constituent of the meron-view-dispatches 1096.

3.2.9 Value Type Categorical Class

Refer to FIG. 21. The value-type 1056 characterizes a type which is passed by value. The value-type 1056 has genus type 1054. A method dispatch-view 1174 specifies a virtual member function which specializes a generic view dispatch to the specific view corresponding to the value-type 1056.

Refer to FIG. 22, which depicts a segment of the meta-module-viewer 1018 corresponding to the value-type 1056. A method view 1176 provides a default implementation for an operant handler processing instances of the value-type 1056. The view 1176 delegates processing to merons and view handlers for base classes, if any. Processing of merons is delegated to a method view-merons 1178. Processing by base handlers is delegated to a method view-base 1180. The view 1176 is a constituent of the class-views 1094. The view-base 1180 delegates view dispatch to the base classes, if any, for an operant handler processing instances of the value-type 1056. The view-base 1180 is a constituent of the base-view-dispatches 1098. The view-merons 1178 delegates view dispatches to the constituent meron members, if any, for an operant handler processing instances of the value-type 1056. The value-type 1056 lacks any merons, so the view-merons 1178 is trivially successful. The view-merons 1178 is a constituent of the meron-view-dispatches 1096.

3.2.10 Bit Type Categorical Class

Refer to FIG. 23. The bit-type 1058 represents a Boolean value, true or false. The bit-type 1058 has genus value-type 1056. A method dispatch-view 1182 specifies a virtual member function which specializes a generic view dispatch to the specific view corresponding to the bit-type 1058.

Refer to FIG. 24, which depicts a segment of the meta-module-viewer 1018 corresponding to the bit-type 1058. A method view 1184 provides a default implementation for an operant handler processing instances of the bit-type 1058. The view 1184 delegates processing to merons and view handlers for base classes, if any. Processing of merons is delegated to a method view-merons 1186. Processing by base handlers is delegated to a method view-base 1188. The view 1184 is a constituent of the class-views 1094. The view-base 1188 delegates view dispatch to the base classes, if any, for an operant handler processing instances of the bit-type 1058. The view-base 1188 is a constituent of the base-view-dispatches 1098. The view-merons 1186 delegates view dispatches to the constituent meron members, if any, for an operant handler processing instances of the bit-type 1058. The bit-type 1058 lacks any merons, so the view-merons 1186 is trivially successful. The view-merons 1186 is a constituent of the meron-view-dispatches 1096.

3.2.11 Text Type Categorical Class

Refer to FIG. 25. The text-type 1060 represents a textual value. The text-type 1060 has genus value-type 1056. A method dispatch-view 1190 specifies a virtual member function which specializes a generic view dispatch to the specific view corresponding to the text-type 1060.

Refer to FIG. 26, which depicts a segment of the meta-module-viewer 1018 corresponding to the text-type 1060. A method view 1192 provides a default implementation for an operant handler processing instances of the text-type 1060. The view 1192 delegates processing to merons and view handlers for base classes, if any. Processing of merons is delegated to a method view-merons 1194. Processing by base handlers is delegated to a method view-base 1196. The view 1192 is a constituent of the class-views 1094. The view-base 1196 delegates view dispatch to the base classes, if any, for an operant handler processing instances of the text-type 1060. The view-base 1196 is a constituent of the base-view-dispatches 1098. The view-merons 1194 delegates view dispatches to the constituent meron members, if any, for an operant handler processing instances of the text-type 1060. The text-type 1060 lacks any merons, so the view-merons 1194 is trivially successful. The view-merons 1194 is a constituent of the meron-view-dispatches 1096.

3.2.12 Reference Type Categorical Class

Refer to FIG. 27. The reference-type 1062 characterizes a type which is passed by reference. The reference-type 1062 corresponds to a class. The reference-type 1062 has genus type 1054. The reference-class-id 1064 identifies the class to which a reference type corresponds. The reference-class-id 1064 ranges over scalar text. The reference-class-id 1064 has singleton arity. A method dispatch-view 1198 specifies a virtual member function which specializes a generic view dispatch to the specific view corresponding to the reference-type 1062.

Refer to FIG. 28, which depicts a segment of the meta-module-viewer 1018 corresponding to the reference-type 1062. A method view 1200 provides a default implementation for an operant handler processing instances of the reference-type 1062. The view 1200 delegates processing to merons and view handlers for base classes, if any. Processing of merons is delegated to a method view-merons 1202. Processing by base handlers is delegated to a method view-base 1204. The view 1200 is a constituent of the class-views 1094. The view-base 1204 delegates view dispatch to the base classes, if any, for an operant handler processing instances of the reference-type 1062. The view-base 1204 is a constituent of the base-view-dispatches 1098. The view-merons 1202 delegates view dispatches to the constituent meron members, if any, for an operant handler processing instances of the reference-type 1062. The reference-type 1062 lacks any merons, so the view-merons 1202 is trivially successful. The view-merons 1202 is a constituent of the meron-view-dispatches 1096.

3.2.13 Compound Type Categorical Class

Refer to FIG. 29. The compound-type 1066 characterizes a type which corresponds to a collection. The compound-type 1066 is parameterized by one or more subsidiary types. The compound-type 1066 has genus type 1054. The range 1068 specifies the characteristic subsidiary type of the elements in the compound type. The range 1068 ranges over instances of the class type 1054. The range 1068 has singleton arity. A method dispatch-view 1206 specifies a virtual member function which specializes a generic view dispatch to the specific view corresponding to the compound-type 1066.

Refer to FIG. 30, which depicts a segment of the meta-module-viewer 1018 corresponding to the compound-type 1066. A method view 1208 provides a default implementation for an operant handler processing instances of the compound-type 1066. The view 1208 delegates processing to merons and view handlers for base classes, if any. Processing of merons is delegated to a method view-merons 1210. Processing by base handlers is delegated to a method view-base 1212. The view 1208 is a constituent of the class-views 1094. The view-base 1212 delegates view dispatch to the base classes, if any, for an operant handler processing instances of the compound-type 1066. The view-base 1212 is a constituent of the base-view-dispatches 1098. The view-merons 1210 delegates view dispatches to the constituent meron members, if any, for an operant handler processing instances of the compound-type 1066. The compound-type 1066 lacks any merons, so the view-merons 1210 is trivially successful. The view-merons 1210 is a constituent of the meron-view-dispatches 1096.

3.2.14 Sequence Type Categorical Class

Refer to FIG. 31. The sequence-type 1070 characterizes a sequence of elements. The sequence-type 1070 specifies a compound element that permits efficient addition or removal of elements at the front or back of the sequence. The sequence-type 1070 specifies a compound element that permits direct access to elements by position in the sequence. The sequence-type 1070 specifies a compound element that permits iteration of the elements in the sequence. The sequence-type 1070 has genus compound-type 1066. A method dispatch-view 1214 specifies a virtual member function which specializes a generic view dispatch to the specific view corresponding to the sequence-type 1070.

Refer to FIG. 32, which depicts a segment of the meta-module-viewer 1018 corresponding to the sequence-type 1070. A method view 1216 provides a default implementation for an operant handler processing instances of the sequence-type 1070. The view 1216 delegates processing to merons and view handlers for base classes, if any. Processing of merons is delegated to a method view-merons 1218. Processing by base handlers is delegated to a method view-base 1220. The view 1216 is a constituent of the class-views 1094. The view-base 1220 delegates view dispatch to the base classes, if any, for an operant handler processing instances of the sequence-type 1070. The view-base 1220 is a constituent of the base-view-dispatches 1098. The view-merons 1218 delegates view dispatches to the constituent meron members, if any, for an operant handler processing instances of the sequence-type 1070. The sequence-type 1070 lacks any merons, so the view-merons 1218 is trivially successful. The view-merons 1218 is a constituent of the meron-view-dispatches 1096.

3.2.15 Value Sequence Type Categorical Class

Refer to FIG. 33. The value-sequence-type 1072 characterizes a sequence of value-typed elements. The value-sequence-type 1072 has genus sequence-type 1070. A method dispatch-view 1222 specifies a virtual member function which specializes a generic view dispatch to the specific view corresponding to the value-sequence-type 1072.

Refer to FIG. 34, which depicts a segment of the meta-module-viewer 1018 corresponding to the value-sequence-type 1072. A method view 1224 provides a default implementation for an operant handler processing instances of the value-sequence-type 1072. The view 1224 delegates processing to merons and view handlers for base classes, if any. Processing of merons is delegated to a method view-merons 1226. Processing by base handlers is delegated to a method view-base 1228. The view 1224 is a constituent of the class-views 1094. The view-base 1228 delegates view dispatch to the base classes, if any, for an operant handler processing instances of the value-sequence-type 1072. The view-base 1228 is a constituent of the base-view-dispatches 1098. The view-merons 1226 delegates view dispatches to the constituent meron members, if any, for an operant handler processing instances of the value-sequence-type 1072. The value-sequence-type 1072 lacks any merons, so the view-merons 1226 is trivially successful. The view-merons 1226 is a constituent of the meron-view-dispatches 1096.

3.2.16 Reference Sequence Type Categorical Class

Refer to FIG. 35. The reference-sequence-type 1074 characterizes a sequence of reference-typed elements. The reference-sequence-type 1074 has genus sequence-type 1070. A method dispatch-view 1230 specifies a virtual member function which specializes a generic view dispatch to the specific view corresponding to the reference-sequence-type 1074.

Refer to FIG. 36, which depicts a segment of the meta-module-viewer 1018 corresponding to the reference-sequence-type 1074. A method view 1232 provides a default implementation for an operant handler processing instances of the reference-sequence-type 1074. The view 1232 delegates processing to merons and view handlers for base classes, if any. Processing of merons is delegated to a method view-merons 1234. Processing by base handlers is delegated to a method view-base 1236. The view 1232 is a constituent of the class-views 1094. The view-base 1236 delegates view dispatch to the base classes, if any, for an operant handler processing instances of the reference-sequence-type 1074. The view-base 1236 is a constituent of the base-view-dispatches 1098. The view-merons 1234 delegates view dispatches to the constituent meron members, if any, for an operant handler processing instances of the reference-sequence-type 1074. The reference-sequence-type 1074 lacks any merons, so the view-merons 1234 is trivially successful. The view-merons 1234 is a constituent of the meron-view-dispatches 1096.

3.2.17 Set Type Categorical Class

Refer to FIG. 37. The set-type 1076 characterizes a set of elements. The set-type 1076 specifies a compound element that permits efficient determination of the presence or absence of a particular element in the set. The set-type 1076 specifies a compound element that permits iteration of elements in the set. The set-type 1076 has genus compound-type 1066. A method dispatch-view 1238 specifies a virtual member function which specializes a generic view dispatch to the specific view corresponding to the set-type 1076.

Refer to FIG. 38, which depicts a segment of the meta-module-viewer 1018 corresponding to the set-type 1076. A method view 1240 provides a default implementation for an operant handler processing instances of the set-type 1076. The view 1240 delegates processing to merons and view handlers for base classes, if any. Processing of merons is delegated to a method view-merons 1242. Processing by base handlers is delegated to a method view-base 1244. The view 1240 is a constituent of the class-views 1094. The view-base 1244 delegates view dispatch to the base classes, if any, for an operant handler processing instances of the set-type 1076. The view-base 1244 is a constituent of the base-view-dispatches 1098. The view-merons 1242 delegates view dispatches to the constituent meron members, if any, for an operant handler processing instances of the set-type 1076. The set-type 1076 lacks any merons, so the view-merons 1242 is trivially successful. The view-merons 1242 is a constituent of the meron-view-dispatches 1096.

3.2.18 Value Set Type Categorical Class

Refer to FIG. 39. The value-set-type 1078 characterizes a set of value-typed elements. The value-set-type 1078 has genus set-type 1076. A method dispatch-view 1246 specifies a virtual member function which specializes a generic view dispatch to the specific view corresponding to the value-set-type 1078.

Refer to FIG. 40, which depicts a segment of the meta-module-viewer 1018 corresponding to the value-set-type 1078. A method view 1248 provides a default implementation for an operant handler processing instances of the value-set-type 1078. The view 1248 delegates processing to merons and view handlers for base classes, if any. Processing of merons is delegated to a method view-merons 1250. Processing by base handlers is delegated to a method view-base 1252. The view 1248 is a constituent of the class-views 1094. The view-base 1252 delegates view dispatch to the base classes, if any, for an operant handler processing instances of the value-set-type 1078. The view-base 1252 is a constituent of the base-view-dispatches 1098. The view-merons 1250 delegates view dispatches to the constituent meron members, if any, for an operant handler processing instances of the value-set-type 1078. The value-set-type 1078 lacks any merons, so the view-merons 1250 is trivially successful. The view-merons 1250 is a constituent of the meron-view-dispatches 1096.

3.2.19 Reference Set Type Categorical Class

Refer to FIG. 41. The reference-set-type 1080 characterizes a set of reference-typed elements. The reference-set-type 1080 has genus set-type 1076. A method dispatch-view 1254 specifies a virtual member function which specializes a generic view dispatch to the specific view corresponding to the reference-set-type 1080.

Refer to FIG. 42, which depicts a segment of the meta-module-viewer 1018 corresponding to the reference-set-type 1080. A method view 1256 provides a default implementation for an operant handler processing instances of the reference-set-type 1080. The view 1256 delegates processing to merons and view handlers for base classes, if any. Processing of merons is delegated to a method view-merons 1258. Processing by base handlers is delegated to a method view-base 1260. The view 1256 is a constituent of the class-views 1094. The view-base 1260 delegates view dispatch to the base classes, if any, for an operant handler processing instances of the reference-set-type 1080. The view-base 1260 is a constituent of the base-view-dispatches 1098. The view-merons 1258 delegates view dispatches to the constituent meron members, if any, for an operant handler processing instances of the reference-set-type 1080. The reference-set-type 1080 lacks any merons, so the view-merons 1258 is trivially successful. The view-merons 1258 is a constituent of the meron-view-dispatches 1096.

3.2.20 Map Type Categorical Class

Refer to FIG. 43. The map-type 1082 characterizes a map associating pairs of elements. The map-type 1082 specifies a compound element that permits association of a range element with a supplied domain element. The map-type 1082 specifies a compound element that permits iteration of pairs. The map-type 1082 has genus compound-type 1066. The domain 1084 specifies the subsidiary type of the domain elements. The domain 1084 ranges over instances of the class type 1054. The domain 1084 has singleton arity. A method dispatch-view 1262 specifies a virtual member function which specializes a generic view dispatch to the specific view corresponding to the map-type 1082.

Refer to FIG. 44, which depicts a segment of the meta-module-viewer 1018 corresponding to the map-type 1082. A method view 1264 provides a default implementation for an operant handler processing instances of the map-type 1082. The view 1264 delegates processing to merons and view handlers for base classes, if any. Processing of merons is delegated to a method view-merons 1266. Processing by base handlers is delegated to a method view-base 1268. The view 1264 is a constituent of the class-views 1094. The view-base 1268 delegates view dispatch to the base classes, if any, for an operant handler processing instances of the map-type 1082. The view-base 1268 is a constituent of the base-view-dispatches 1098. The view-merons 1266 delegates view dispatches to the constituent meron members, if any, for an operant handler processing instances of the map-type 1082. The map-type 1082 lacks any merons, so the view-merons 1266 is trivially successful. The view-merons 1266 is a constituent of the meron-view-dispatches 1096.

3.2.21 Index Map Type Categorical Class

Refer to FIG. 45. The index-map-type 1086 characterizes a map, of which the range elements are of reference type and the domain elements are of value type. The index-map-type 1086 has genus map-type 1082. A method dispatch-view 1270 specifies a virtual member function which specializes a generic view dispatch to the specific view corresponding to the index-map-type 1086.

Refer to FIG. 46, which depicts a segment of the meta-module-viewer 1018 corresponding to the index-map-type 1086. A method view 1272 provides a default implementation for an operant handler processing instances of the index-map-type 1086. The view 1272 delegates processing to merons and view handlers for base classes, if any. Processing of merons is delegated to a method view-merons 1274. Processing by base handlers is delegated to a method view-base 1276. The view 1272 is a constituent of the class-views 1094. The view-base 1276 delegates view dispatch to the base classes, if any, for an operant handler processing instances of the index-map-type 1086. The view-base 1276 is a constituent of the base-view-dispatches 1098. The view-merons 1274 delegates view dispatches to the constituent meron members, if any, for an operant handler processing instances of the index-map-type 1086. The index-map-type 1086 lacks any merons, so the view-merons 1274 is trivially successful. The view-merons 1274 is a constituent of the meron-view-dispatches 1096.

3.2.22 Scale Map Type Categorical Class

Refer to FIG. 47. The scale-map-type 1088 characterizes a map, of which the range elements are of value type and the domain elements are of reference type. The scale-map-type 1088 has genus map-type 1082. A method dispatch-view 1278 specifies a virtual member function which specializes a generic view dispatch to the specific view corresponding to the scale-map-type 1088.

Refer to FIG. 48, which depicts a segment of the meta-module-viewer 1018 corresponding to the scale-map-type 1088. A method view 1280 provides a default implementation for an operant handler processing instances of the scale-map-type 1088. The view 1280 delegates processing to merons and view handlers for base classes, if any. Processing of merons is delegated to a method view-merons 1282. Processing by base handlers is delegated to a method view-base 1284. The view 1280 is a constituent of the class-views 1094. The view-base 1284 delegates view dispatch to the base classes, if any, for an operant handler processing instances of the scale-map-type 1088. The view-base 1284 is a constituent of the base-view-dispatches 1098. The view-merons 1282 delegates view dispatches to the constituent meron members, if any, for an operant handler processing instances of the scale-map-type 1088. The scale-map-type 1088 lacks any merons, so the view-merons 1282 is trivially successful. The view-merons 1282 is a constituent of the meron-view-dispatches 1096.

3.2.23 Bind Map Type Categorical Class

Refer to FIG. 49. The bind-map-type 1090 characterizes a map, of which both the range and domain elements are of reference type. The bind-map-type 1090 has genus map-type 1082. A method dispatch-view 1286 specifies a virtual member function which specializes a generic view dispatch to the specific view corresponding to the bind-map-type 1090.

Refer to FIG. 50, which depicts a segment of the meta-module-viewer 1018 corresponding to the bind-map-type 1090. A method view 1288 provides a default implementation for an operant handler processing instances of the bind-map-type 1090. The view 1288 delegates processing to merons and view handlers for base classes, if any. Processing of merons is delegated to a method view-merons 1290. Processing by base handlers is delegated to a method view-base 1292. The view 1288 is a constituent of the class-views 1094. The view-base 1292 delegates view dispatch to the base classes, if any, for an operant handler processing instances of the bind-map-type 1090. The view-base 1292 is a constituent of the base-view-dispatches 1098. The view-merons 1290 delegates view dispatches to the constituent meron members, if any, for an operant handler processing instances of the bind-map-type 1090. The bind-map-type 1090 lacks any merons, so the view-merons 1290 is trivially successful. The view-merons 1290 is a constituent of the meron-view-dispatches 1096.

3.2.24 Convert Map Type Categorical Class

Refer to FIG. 51. The convert-map-type 1092 characterizes a map, of which both the range and domain elements are of value type. The convert-map-type 1092 has genus map-type 1082. A method dispatch-view 1294 specifies a virtual member function which specializes a generic view dispatch to the specific view corresponding to the convert-map-type 1092.

Refer to FIG. 52, which depicts a segment of the meta-module-viewer 1018 corresponding to the convert-map-type 1092. A method view 1296 provides a default implementation for an operant handler processing instances of the convert-map-type 1092. The view 1296 delegates processing to merons and view handlers for base classes, if any. Processing of merons is delegated to a method view-merons 1298. Processing by base handlers is delegated to a method view-base 1300. The view 1296 is a constituent of the class-views 1094. The view-base 1300 delegates view dispatch to the base classes, if any, for an operant handler processing instances of the convert-map-type 1092. The view-base 1300 is a constituent of the base-view-dispatches 1098. The view-merons 1298 delegates view dispatches to the constituent meron members, if any, for an operant handler processing instances of the convert-map-type 1092. The convert-map-type 1092 lacks any merons, so the view-merons 1298 is trivially successful. The view-merons 1298 is a constituent of the meron-view-dispatches 1096.

4 Operant Specifications 4.1 Type Definer View Operant

Refer to FIG. 53. A view-operant type definer 1302 processes an instance of the type 1054. The type definer 1302 has base the meta-module-viewer 1018. A datum type identifier 1304 defines an identifier which corresponds to the specified type. A datum type definition 1306 provides a programming-language definition for the specified type. A datum typedef definition 1308 defines a particular typedef, corresponding to the compound-type 1066. A datum include requirement 1310 defines a required include file for the type, if any. A datum template specifier 1312 defines a template identifier for the type, if appropriate.

Refer to FIG. 54. A view-entry type-entry 1314 receives an instance of the type 1054. A datum type 1316 provides an argument containing the instance of the type 1054 upon which the type-entry 1314 operates. A step 1318 dispatches the type 1316.

Refer to FIG. 55. A view-handler view-bit-type 1320 receives an instance of the bit-type 1058, and operates on the type identifier 1304. A datum bit-type 1322 provides an argument containing the instance of the bit-type 1058 upon which the view-bit-type 1320 operates. A step 1324 writes a boolean specifier to the type identifier 1304. A step 1326 returns boolean true, indicating success in processing the supplied bit-type 1322.

Refer to FIG. 56. A view-handler view-text-type 1328 receives an instance of the text-type 1060, and operates on the type identifier 1304. A datum text-type 1330 provides an argument containing the instance of the text-type 1060 upon which the view-text-type 1328 operates. A step 1332 writes a text specifier to the type identifier 1304. A step 1334 returns boolean true, indicating success in processing the supplied text-type 1330.

Refer to FIG. 57. A view-handler view-reference-type 1336 receives an instance of the reference-type 1062, and operates on the type identifier 1304 and the type definition 1306. A datum reference-type 1338 provides an argument containing the instance of the reference-type 1062 upon which the view-reference-type 1336 operates. A step 1340 writes the type identifier 1304 using the reference-class-id 1064 of the reference-type 1338. A step 1342 writes a pointer specifier to the type definition 1306 using the reference-class-id 1064 of the reference-type 1338. A step 1344 returns boolean true, indicating success in processing the supplied reference-type 1338.

Refer to FIG. 58. A view-handler view-compound-type 1346 receives an instance of the compound-type 1066, and operates on the typedef definition 1308, the type identifier 1304, and the type definition 1306. A datum compound-type 1348 provides an argument containing the instance of the compound-type 1066 upon which the view-compound-type 1346 operates. A step 1350 writes the typedef definition 1308 using the type identifier 1304 and the type definition 1306. A step 1352 returns boolean true, indicating success in processing the supplied compound-type 1348.

Refer to FIG. 59. A view-handler view-sequence-type 1354 receives an instance of the sequence-type 1070, and operates on the type identifier 1304, the type definition 1306, the include requirement 1310, and the template specifier 1312. A datum sequence-type 1356 provides an argument containing the instance of the sequence-type 1070 upon which the view-sequence-type 1354 operates. A step 1358 writes a sequence include directive to the include requirement 1310. A step 1360 delegates to the range 1068 of the sequence-type 1356. A step 1362 writes the type definition 1306 using the type identifier 1304 of the delegate and the template specifier 1312. A step 1364 writes the type identifier 1304 using the type identifier 1304 of the delegate. A step 1366 dispatches to the bases of the sequence-type 1356. A step 1368 returns boolean true, indicating success in processing the supplied sequence-type 1356.

Refer to FIG. 60. A view-handler view-reference-sequence-type 1370 receives an instance of the reference-sequence-type 1074, and operates on the template specifier 1312. A datum reference-sequence-type 1372 provides an argument containing the instance of the reference-sequence-type 1074 upon which the view-reference-sequence-type 1370 operates. A step 1374 writes a pointer sequence template specifier to the template specifier 1312. A step 1376 dispatches to the bases of the reference-sequence-type 1372. A step 1378 returns boolean true, indicating success in processing the supplied reference-sequence-type 1372.

Refer to FIG. 61. A view-handler view-value-sequence-type 1380 receives an instance of the value-sequence-type 1072, and operates on the template specifier 1312. A datum value-sequence-type 1382 provides an argument containing the instance of the value-sequence-type 1072 upon which the view-value-sequence-type 1380 operates. A step 1384 writes a sequence template specifier to the template specifier 1312. A step 1386 dispatches to the bases of the value-sequence-type 1382. A step 1388 returns boolean true, indicating success in processing the supplied value-sequence-type 1382.

Refer to FIG. 62. A view-handler view-set-type 1390 receives an instance of the set-type 1076, and operates on the type identifier 1304, the type definition 1306, the include requirement 1310, and the template specifier 1312. A datum set-type 1392 provides an argument containing the instance of the set-type 1076 upon which the view-set-type 1390 operates. A step 1394 writes a set include directive to the include requirement 1310. A step 1396 delegates to the range 1068 of the set-type 1392. A step 1398 writes the type definition 1306 using the type identifier 1304 of the delegate and the template specifier 1312. A step 1400 writes the type identifier 1304 using the type identifier 1304 of the delegate. A step 1402 dispatches to the bases of the set-type 1392. A step 1404 returns boolean true, indicating success in processing the supplied set-type 1392.

Refer to FIG. 63. A view-handler view-reference-set-type 1406 receives an instance of the reference-set-type 1080, and operates on the template specifier 1312. A datum reference-set-type 1408 provides an argument containing the instance of the reference-set-type 1080 upon which the view-reference-set-type 1406 operates. A step 1410 writes a pointer set template specifier to the template specifier 1312. A step 1412 dispatches to the bases of the reference-set-type 1408. A step 1414 returns boolean true, indicating success in processing the supplied reference-set-type 1408.

Refer to FIG. 64. A view-handler view-value-set-type 1416 receives an instance of the value-set-type 1078, and operates on the template specifier 1312. A datum value-set-type 1418 provides an argument containing the instance of the value-set-type 1078 upon which the view-value-set-type 1416 operates. A step 1420 writes a set template specifier to the template specifier 1312. A step 1422 dispatches to the bases of the value-set-type 1418. A step 1424 returns boolean true, indicating success in processing the supplied value-set-type 1418.

Refer to FIG. 65. A view-handler view-map-type 1426 receives an instance of the map-type 1082, and operates on the type identifier 1304, the type definition 1306, the include requirement 1310, and the template specifier 1312. A datum map-type 1428 provides an argument containing the instance of the map-type 1082 upon which the view-map-type 1426 operates. A step 1430 writes a map include directive to the include requirement 1310. A step 1432 delegates to the range 1068 of the map-type 1428. A step 1434 delegates to the domain 1084 of the map-type 1428. A step 1436 writes the type definition 1306 using the type identifier 1304 of the delegate, the type identifier 1304 of the delegate, and the template specifier 1312. A step 1438 writes the type identifier 1304 using the type identifier 1304 of the delegate, the type identifier 1304 of the delegate, and the template specifier 1312. A step 1440 dispatches to the bases of the map-type 1428. A step 1442 returns boolean true, indicating success in processing the supplied map-type 1428.

Refer to FIG. 66. A view-handler view-index-map-type 1444 receives an instance of the index-map-type 1086, and operates on the template specifier 1312. A datum index-map-type 1446 provides an argument containing the instance of the index-map-type 1086 upon which the view-index-map-type 1444 operates. A step 1448 writes an index template specifier to the template specifier 1312. A step 1450 dispatches to the bases of the index-map-type 1446. A step 1452 returns boolean true, indicating success in processing the supplied index-map-type 1446.

Refer to FIG. 67. A view-handler view-scale-map-type 1454 receives an instance of the scale-map-type 1088, and operates on the template specifier 1312. A datum scale-map-type 1456 provides an argument containing the instance of the scale-map-type 1088 upon which the view-scale-map-type 1454 operates. A step 1458 writes a scale template specifier to the template specifier 1312. A step 1460 dispatches to the bases of the scale-map-type 1456. A step 1462 returns boolean true, indicating success in processing the supplied scale-map-type 1456.

Refer to FIG. 68. A view-handler view-bind-map-type 1464 receives an instance of the bind-map-type 1090, and operates on the template specifier 1312. A datum bind-map-type 1466 provides an argument containing the instance of the bind-map-type 1090 upon which the view-bind-map-type 1464 operates. A step 1468 writes a bind template specifier to the template specifier 1312. A step 1470 dispatches to the bases of the bind-map-type 1466. A step 1472 returns boolean true, indicating success in processing the supplied bind-map-type 1466.

Refer to FIG. 69. A view-handler view-convert-map-type 1474 receives an instance of the convert-map-type 1092, and operates on the template specifier 1312. A datum convert-map-type 1476 provides an argument containing the instance of the convert-map-type 1092 upon which the view-convert-map-type 1474 operates. A step 1478 writes a convert template specifier to the template specifier 1312. A step 1480 dispatches to the bases of the convert-map-type 1476. A step 1482 returns boolean true, indicating success in processing the supplied convert-map-type 1476.

4.2 Forwards Writer View Operant

Refer to FIG. 70. A view-operant forwards writer 1484 processes an instance of the module 1024. The forwards writer 1484 has base the meta-module-viewer 1018. A datum viewer forward declaration 1486 declares a viewer class. A datum forward class declarations 1488 defines forward class declarations for constituents of the specified module. A datum editor forward declaration 1490 declares an editor class. A datum categorical class forward declaration 1492 declares a categorical class. A datum include directives 1494 defines directives for include files required by the specified module. A datum typedef definitions 1496 associates type identifiers with type definitions corresponding to compound types used by the specified module. A datum host forward declaration 1498 declares a host class.

Refer to FIG. 71. A view-entry module-entry 1500 receives an instance of the module 1024, and operates on the forward class declarations 1488, the viewer forward declaration 1486, and the editor forward declaration 1490. A datum module 1502 provides an argument containing the instance of the module 1024 upon which the module-entry 1500 operates. A step 1504 dispatches the classes 1026 of the module 1502. A step 1506 dispatches the host 1028 of the module 1502. A step 1508 writes the viewer forward declaration 1486 using the viewer-id 1030 of the module 1502. A step 1510 accumulates the viewer forward declaration 1486 to the forward class declarations 1488. A step 1512 writes the editor forward declaration 1490 using the editor-id 1032 of the module 1502. A step 1514 accumulates the editor forward declaration 1490 to the forward class declarations 1488.

Refer to FIG. 72. A view-handler view class 1516 receives an instance of the class 1034, and operates on the forward class declarations 1488 and the categorical class forward declaration 1492. A datum class 1518 provides an argument containing the instance of the class 1034 upon which the view-class 1516 operates. A step 1520 writes the categorical class forward declaration 1492 using the id 1022 of the class 1518. A step 1522 accumulates the categorical class forward declaration 1492 to the forward class declarations 1488. A step 1524 dispatches the members 1038 of the class 1518. A step 1526 returns boolean true, indicating success in processing the supplied class 1518.

Refer to FIG. 73. A view-handler view-member-datum 1528 receives an instance of the member-datum 1050, and operates on the include directives 1494, the typedef definitions 1496, the typedef definition 1308, and the include requirement 1310. A datum member-datum 1530 provides an argument containing the instance of the member-datum 1050 upon which the view-member-datum 1528 operates. A step 1532 delegates to the type 1046 of the member-datum 1530. A step 1534 accumulates the include requirement 1310 of the delegate to the include directives 1494. A step 1536 accumulates the typedef definition 1308 of the delegate to the typedef definitions 1496. A step 1538 returns boolean true, indicating success in processing the supplied member-datum 1530.

Refer to FIG. 74. A view-handler view-host-class 1540 receives an instance of the host-class 1040, and operates on the forward class declarations 1488 and the host forward declaration 1498. A datum host-class 1542 provides an argument containing the instance of the host-class 1040 upon which the view-host-class 1540 operates. A step 1544 writes the host forward declaration 1498 using the id 1022 of the host-class 1542. A step 1546 accumulates the host forward declaration 1498 to the forward class declarations 1488. A step 1548 returns boolean true, indicating success in processing the supplied host-class 1542.

4.3 Member Datum Writer View Operant

Refer to FIG. 75. A view-operant member datum writer 1550 processes an instance of the member-datum 1050. The member datum writer 1550 has base the meta-module-viewer 1018. A datum member datum definition 1552 provides the definition for the specified datum. A datum datum initializer 1554 defines an initial value for the specified datum. A datum datum cleanup 1556 defines a cleanup operation for the specified datum. A datum member meron view dispatch operation 1558 defines a dispatch to view a meron corresponding to the specified datum. A datum member meron edit dispatch operation 1560 defines a dispatch to edit a particular meron of a specified class. A datum view access definition 1562 defines a view access member function for a specified datum. A datum view access definitions 1564 collects member functions for view access to member data. A datum reset access definition 1566 defines a reset access member function for a specified datum. A datum reset access definitions 1568 collects member functions for reset access to member data. A datum edit access definition 1570 defines an edit access member function for a specified datum. A datum edit access definitions 1572 collects member functions for edit access to member data.

Refer to FIG. 76. A view-entry member-datum-entry 1574 receives an instance of the member-datum 1050, and operates on the member datum definition 1552 and the type identifier 1304. A datum member-datum 1576 provides an argument containing the instance of the member-datum 1050 upon which the member-datum-entry 1574 operates. A step 1578 delegates to the type 1046 of the member-datum 1576. A step 1580 writes the member datum definition 1552 using the scope-id 1044 of the member-datum 1576 and the type identifier 1304 of the delegate. A step 1582 dispatches the type 1046 of the member-datum 1576.

Refer to FIG. 77. A view-handler view-value-type 1584 receives an instance of the value-type 1056, and operates on the view access definitions 1564, the view access definition 1562, the reset access definitions 1568, the reset access definition 1566, and the type identifier 1304. A datum value-type 1586 provides an argument containing the instance of the value-type 1056 upon which the view-value-type 1584 operates. A step 1588 writes the view access definition 1562 using the scope-id 1044 of the datum and the type identifier 1304 of the delegate. A step 1590 accumulates the view access definition 1562 to the view access definitions 1564. A step 1592 writes the reset access definition 1566 using the scope-id 1044 of the datum and the type identifier 1304 of the delegate. A step 1594 accumulates the reset access definition 1566 to the reset access definitions 1568. A step 1596 returns boolean true, indicating success in processing the supplied value-type 1586.

Refer to FIG. 78. A view-handler view-reference-type 1598 receives an instance of the reference-type 1062, and operates on the datum initializer 1554, the datum cleanup 1556, the view access definitions 1564, the view access definition 1562, the edit access definitions 1572, the edit access definition 1570, the reset access definitions 1568, the reset access definition 1566, the type identifier 1304, the member meron view dispatch operation 1558, and the member meron edit dispatch operation 1560. A datum reference-type 1600 provides an argument containing the instance of the reference-type 1062 upon which the view-reference-type 1598 operates. A step 1602 writes the view access definition 1562 using the scope-id 1044 of the datum and the type identifier 1304 of the delegate. A step 1604 accumulates the view access definition 1562 to the view access definitions 1564. A step 1606 writes the edit access definition 1570 using the scope-id 1044 of the datum and the type identifier 1304 of the delegate. A step 1608 accumulates the edit access definition 1570 to the edit access definitions 1572. A step 1610 writes the reset access definition 1566 using the scope-id 1044 of the datum and the type identifier 1304 of the delegate. A step 1612 writes the datum initializer 1554. A step 1614 tests for is-meron 1052 of the datum. A step 1616 writes the datum cleanup 1556 using the scope-id 1044 of the datum. A step 1618 writes the reset access definition 1566 using the scope-id 1044 of the datum. A step 1620 writes the member meron view dispatch operation 1558 using the scope-id 1044 of the datum. A step 1622 writes the member meron edit dispatch operation 1560 using the scope-id 1044 of the datum. A step 1624 accumulates the reset access definition 1566 to the reset access definitions 1568. A step 1626 returns boolean true, indicating, success in processing the supplied reference-type 1600.

Refer to FIG. 79. A view-handler view-compound-type 1628 receives an instance of the compound-type 1066, and operates on the datum cleanup 1556, the view access definitions 1564, the view access definition 1562, the edit access definitions 1572, the edit access definition 1570, and the type identifier 1304. A datum compound-type 1630 provides an argument containing the instance of the compound-type 1066 upon which the view-compound-type 1628 operates. A step 1632 writes the view access definition 1562 using the scope-id 1044 of the datum and the type identifier 1304 of the delegate. A step 1634 accumulates the view access definition 1562 to the view access definitions 1564. A step 1636 writes the edit access definition 1570 using the scope-id 1044 of the datum and the type identifier 1304 of the delegate. A step 1638 accumulates the edit access definition 1570 to the edit access definitions 1572. A step 1640 tests for is-meron 1052 of the datum. A step 1642 writes the datum cleanup 1556 using the scope-id 1044 of the datum. A step 1644 returns boolean true, indicating success in processing the supplied compound-type 1630.

Refer to FIG. 80. A view-handler view-reference-sequence-type 1646 receives an instance of the reference-sequence-type 1074, and operates on the member meron view dispatch operation 1558 and the member meron edit dispatch operation 1560. A datum reference-sequence-type 1648 provides an argument containing the instance of the reference-sequence-type 1074 upon which the view-reference-sequence-type 1646 operates. A step 1650 tests for is-meron 1052 of the datum. A step 1652 writes the member meron view dispatch operation 1558 using the scope-id 1044 of the datum. A step 1654 writes the member meron edit dispatch operation 1560 using the scope-id 1044 of the datum. A step 1656 returns boolean true, indicating success in processing the supplied reference-sequence-type 1648.

Refer to FIG. 81. A view-handler view-reference-set-type 1658 receives an instance of the reference-set-type 1080, and operates on the member meron view dispatch operation 1558 and the member meron edit dispatch operation 1560. A datum reference-set-type 1660 provides an argument containing the instance of the reference-set-type 1080 upon which the view-reference-set-type 1658 operates. A step 1662 tests for is-meron 1052 of the datum. A step 1664 writes the member meron view dispatch operation 1558 using the scope-id 1044 of the datum. A step 1666 writes the member meron edit dispatch operation 1560 using the scope-id 1044 of the datum. A step 1668 returns boolean true, indicating success in processing the supplied reference-set-type 1660.

4.4 Class Writer View Operant

Refer to FIG. 82. A view-operant class writer 1670 processes an instance of the class 1034. The class writer 1670 has base the meta-module-viewer 1018. A datum categorical class definition 1672 defines a categorical class for the specified module. A datum class view definition 1674 defines a member function of the viewer, responsive to an instance of a categorical class, dispatching views corresponding to its merons and base classes, if any. A datum class edit definition 1676 defines a member function of the editor, responsive to an instance of a categorical class, dispatching edits corresponding to its merons and base classes, if any. A datum meron view dispatch operations 1678 defines a collection of dispatch operations to the merons of a specified class, if any. A datum meron edit dispatch operations 1680 defines a collection of dispatch operations to the merons of a specified class, if any. A datum member data definitions 1682 defines the members of the class. A datum base class view dispatch operation 1684 defines a dispatch corresponding to a particular base class of a specified class. A datum base class view dispatch operations 1686 defines a collection of dispatches to views corresponding to the base classes of a specified class, if any. A datum view dispatch 1688 defines a member function of a categorical class to dispatch a view by a viewer. A datum base class edit dispatch operation 1690 defines a dispatch corresponding to a particular base class of a categorical class. A datum base class edit dispatch operations 1692 defines a collection of dispatches to edits corresponding to the base classes of a categorical class, if any. A datum edit dispatch 1694 defines a member function of the categorical class to dispatch an edit by an editor. A datum initializations 1696 defines expressions for initialization of member data. A datum cleanup expressions 1698 defines expressions for cleanup of member data.

Refer to FIG. 83. A view-entry class-entry 1700 receives an instance of the class 1034, and operates on the categorical class definition 1672, the member data definitions 1682, the view dispatch 1688, the edit dispatch 1694, the class view definition 1674, the meron view dispatch operations 1678, the base class view dispatch operations 1686, the base class view dispatch operation 1684, the class edit definition 1676, the meron edit dispatch operations 1680, the base class edit dispatch operations 1692, and the base class edit dispatch operation 1690. A datum class 1702 provides an argument containing the instance of the class 1034 upon which the class-entry 1700 operates. A step 1704 dispatches the members 1038 of the class 1702. A step 1706 accumulates the meron view dispatch operations 1678 to the class view definition 1674. A step 1708 accumulates the meron edit dispatch operations 1680 to the class edit definition 1676. A step 1710 accumulates the member data definitions 1682 to the categorical class definition 1672. A step 1712 iterates a genus class over each of the genera 1036 of the class 1702. A step 1714 writes the base class view dispatch operation 1684 using the genus class. A step 1716 accumulates the base class view dispatch operation 1684 to the base class view dispatch operations 1686. A step 1718 accumulates the base class view dispatch operations 1686 to the class view definition 1674. A step 1720 writes the view dispatch 1688. A step 1722 accumulates the view dispatch 1688 to the categorical class definition 1672. A step 1724 iterates a genus class over each of the genera 1036 of the class 1702. A step 1726 writes the base class edit dispatch operation 1690 using the genus class. A step 1728 accumulates the base class edit dispatch operation 1690 to the base class edit dispatch operations 1692. A step 1730 accumulates the base class edit dispatch operations 1692 to the class edit definition 1676. A step 1732 writes the edit dispatch 1694. A step 1734 accumulates the edit dispatch 1694 to the categorical class definition 1672.

Refer to FIG. 84. A view-handler view-member-datum 1736 receives an instance of the member-datum 1050, and operates on the member data definitions 1682, the member datum definition 1552, the datum initializer 1554, the datum cleanup 1556, the initializations 1696, the cleanup expressions 1698, the meron view dispatch operations 1678, the member meron view dispatch operation 1558, and the member meron edit dispatch operation 1560. A datum member-datum 1738 provides an argument containing the instance of the member-datum 1050 upon which the view-member-datum 1736 operates. A step 1740 delegates to the member-datum 1738. A step 1742 accumulates the member datum definition 1552 of the delegate to the member data definitions 1682. A step 1744 accumulates the datum initializer 1554 of the delegate to the initializations 1696. A step 1746 accumulates the datum cleanup 1556 of the delegate to the cleanup expressions 1698. A step 1748 accumulates the member meron view dispatch operation 1558 of the delegate to the meron view dispatch operations 1678. A step 1750 returns boolean true, indicating success in processing the supplied member-datum 1738.

4.5 Module Writer View Operant

Refer to FIG. 85. A view-operant module writer 1752 processes an instance of the module 1024. The module writer 1752 has base the meta-module-viewer 1018. A datum module definition 1754 provides class definitions for the specified module. A datum viewer class definition 1756 defines a viewer class for the specified module. The viewer class definition 1756 provides a base class suitable for specialization to process a domain-specific object-oriented data structure corresponding to the specified module. A datum class view definitions 1758 collects the class view definition 1674 member functions. A datum editor class definition 1760 defines an editor class for the specified module. The editor class definition 1760 provides a base class suitable for specialization to process a domain-specific object-oriented data structure corresponding to the specified module. A datum class edit definitions 1762 collects the class edit definition 1676 member functions. A datum categorical class definitions 1764 defines the categorical classes for the specified module. A datum host class definition 1766 defines the host class for the specified module.

Refer to FIG. 86. A view-entry module-entry 1768 receives an instance of the module 1024, and operates on the viewer class definition 1756, the class view definitions 1758, the editor class definition 1760, and the class edit definitions 1762. A datum module 1770 provides an argument containing the instance of the module 1024 upon which the module-entry 1768 operates. A step 1772 dispatches the host 1028 of the module 1770. A step 1774 dispatches the classes 1026 of the module 1770. A step 1776 accumulates the class view definitions 1758 to the viewer class definition 1756. A step 1778 accumulates the class edit definitions 1762 to the editor class definition 1760.

Refer to FIG. 87. A view-handler view-class 1780 receives an instance of the class 1034, and operates on the categorical class definitions 1764, the categorical class definition 1672, the class view definitions 1758, the class view definition 1674, the class edit definitions 1762, and the class edit definition 1676. A datum class 1782 provides an argument containing the instance of the class 1034 upon which the view-class 1780 operates. A step 1784 delegates to the class 1782. A step 1786 accumulates the categorical class definition 1672 of the delegate to the categorical class definitions 1764. A step 1788 accumulates the class view definition 1674 of the delegate to the class view definitions 1758. A step 1790 accumulates the class edit definition 1676 of the delegate to the class edit definitions 1762. A step 1792 returns boolean true, indicating success in processing the supplied class 1782.

Refer to FIG. 88. A view-handler view-host-class 1794 receives an instance of the host-class 1040, and operates on the host class definition 1766 and the member data definitions 1682. A datum host-class 1796 provides an argument containing the instance of the host-class 1040 upon which the view-host-class 1794 operates. A step 1798 delegates to the host-class 1796. A step 1800 accumulates the member data definitions 1682 of the delegate to the host class definition 1766. A step 1802 returns boolean true, indicating success in processing the supplied host-class 1796.

5 Example Module Specification and Definition

A simple application demonstrates the production of a module definition from a module specification. The demonstration application recursively scans one or more file-system directories looking for media files. The media files which are detected are presented in a collection of interlinked HTML pages. The pages of the presentation reflect the directory organization of the scanned directories. Each discovered media file is presented in a hypertext link. The pages of the presentation are suitable for service by a web server running on a dedicated media device, such as a digital video recorder. Activation of a link presenting a particular media file generates a request to play the associated media on the dedicated media device. The application may form a potentially useful element for remote, web-oriented management of a dedicated media device.

The demonstration application uses a representation of media files in a file system. The representation uses an object-oriented module including a family of interrelated classes. The classes represent files and directories. The object-oriented module is specified using a module specification language.

5.1 Example Module Specification

Refer to FIG. 89, which depicts a module specification using a module specification language, which is fully disclosed in a co-pending application. A module media-scanner 1804 represents media files arranged in a file system. The media-scanner 1804 corresponds to an instance of the module 1024. A class host 1806 represents an instantiation of the module. The host 1806 corresponds to an instance of the host 1028. A class viewer 1808 specifies a viewer class definition 1756 to be defined. This example does not specify a editor class definition 1760.

The media-scanner 1804 specifies the following classes; these are examples of the classes 1026. A class file 1810 represents a file in a file system, including regular files and directories. The file 1810 has no genera. A class directory 1812 represents a file system directory, potentially containing files, some of which may themselves be directories. The directory 1812 specializes the file 1810. The specialization exemplifies the genera 1036. A class top-directory 1814 represents a topmost directory from which a scan has been initiated. The top-directory 1814 specializes the directory 1812. A class regular-file 1816 represents a regular file, i.e. a file which is not a directory. The regular-file 1816 specializes the file 1810. A class audio-file 1818 represents an audio file. The audio-file 1818 specializes the regular-file 1816. A class video-file 1820 represents a video file. The video-file 1820 specializes the regular-file 1816.

A member datum root-files 1822, specified for the host 1806, specifies a set of instances of the file 1810. The root-files 1822 represents the top-level collection of files in a scan. The root-files 1822 exemplifies the members 1038. The root-files 1822 is specified as a meron, corresponding to the is-meron 1052. Other member data include, for the file 1810, a member datum parent 1824 and a member datum name 1826. The parent 1824 represents the directory containing a particular file. The parent 1824 exemplifies the use of the reference-type 1062. The name 1826 represents the name associated with a particular file in a particular directory. The name 1826 exemplifies the use of the text-type 1060. For the directory 1812, a member datum files 1828 is specified. The files 1828 represents the collection of files contained in a particular directory. The files 1828 exemplifies the use of the reference-set-type 1080. The files 1828 also exemplifies meron specification corresponding to the is-meron 1052.

5.2 Example Module Definition

Refer to FIG. 90, which depicts an exemplary module definition for an object-oriented module suitable for representation of media files in a file system. The module definition 1754 is exemplified by a collection of definitions corresponding to the specification of the media-scanner 1804. The include directives 1494 are exemplified by an include for the set. Forward definitions are provided for the module classes, include the categorical classes file 1810, directory 1812, etc., as well as the unitary classes host 1806 and viewer 1808. The typedef definitions 1496, are exemplified by a type definition for sets of files.

A definition corresponding to the host 1806 exemplifies the host class definition 1766. The definition includes an example of the member datum definition 1552, corresponding to the root-files 1822. Also corresponding to the root-files 1822 are examples of the edit access definitions 1572 and the view access definitions 1564. In the destructor for the host 1806, an example of the cleanup expressions 1698 and of the datum cleanup 1556 may be seen, corresponding to the specification of the is-meron 1052 for the root-files 1822.

Refer to FIG. 91, which continues the depiction of an exemplary module definition for an object-oriented module suitable for representation of media files in a file system. Class definitions corresponding to the file 1810 and the directory 1812 exemplify the categorical class definitions 1764.

The definition corresponding to the file 1810, exemplifying the categorical class definition 1672, includes member data definitions exemplifying the member data definitions 1682 and the member datum definition 1552. The parent 1824 is exemplary of the reference-type 1830. The name 1826 is exemplary of the value-type 1832 and the text-type 1834. Examples of the view access definitions 1564 and the reset access definitions 1568 are defined for both data; the edit access definitions 1572 is defined only for the parent 1824 with the reference-type 1830. An example of the view dispatch 1688 is exhibited. Examples of the datum initializer 1554 and the initializations 1696 are defined for the parent 1824. An example of the view dispatch 1688 is also defined.

The definition corresponding to the directory 1812, further exemplifies the categorical class definition 1672. The genera 1036 of the directory 1812 is reflected in the public derivation from the file 1810. The member data definition for the files 1828 exemplifies the reference-set-type 1836. Access to the files 1828 exemplifies the edit access definitions 1572 and the view access definitions 1564. An additional example of the view dispatch 1688 is exhibited. The consequence of the is-meron 1052 applicable to the files 1828 is exemplified in the destructor definition, where examples of the cleanup expressions 1698 and examples of the datum cleanup 1556 are exhibited.

The module definition 1754 includes additional categorical class definitions 1764, but these are omitted since they add little to the present examples.

Refer to FIG. 92, which continues the depiction of an exemplary module definition for an object-oriented module suitable for representation of media files in a file system. A definition corresponding to the viewer 1808 is shown, exemplary of the viewer class definition 1756. For each categorical class specified in the media-scanner 1804, a class view definition 1674 is defined; together these make up the class view definitions 1758. Examples are exhibited for the file 1810 and the directory 1812; others are omitted since they add little to the present examples.

In each of the exemplary class view definitions 1758, dispatches are made to subsidiary member functions corresponding to the merons and the base classes of the supplied argument. For the exemplary class view definition 1674 corresponding to the file 1810, there are corresponding dispatches to member functions for the merons and bases, but in both cases these are empty hence relatively uninteresting. The exemplary class view definition 1674 corresponding to the directory 1812 leads to more interesting subsidiary operation. In the meron view, an exemplary meron view dispatch operations 1678, and member meron view dispatch operation 1558 are exhibited. The meron view dispatches to the aggregate viewer operating on the files 1828, which was designated by the is-meron 1052. In the base view, an exemplary base class view dispatch operations 1686 is exhibited, dispatching to the class view definitions 1758 corresponding to the file 1810, as specified by the genera 1036 for the directory 1812.

6 Alternative Embodiments

The specializations of the value-type 1056 in the exemplary embodiment are representative but far from comprehensive. In an alternative embodiment, value types representing integers, floating point numbers, cardinal numbers, dates, times, geographical positions, etc., could be provided.

The specializations of the compound-type 1066 in the exemplary embodiment are sufficient for a wide range of applications, but additional compound types could be provided in an alternative embodiment. Compound types representing lists, heaps, multimaps, multisets, graphs, vectors, matrices, etc, could be provided in an alternative embodiment. Provision for compound types of compound types could also be provided in an alternative embodiment. The effect of nested compound types is readily obtained by providing categorical classes which simply contain the nested type as a member.

In the exemplary embodiments of the categorical classes and the operants, member data has been exhibited in a public scope. The exemplary embodiments of the operants utilize categorical class data accordingly. Exhibition of member data in a public scope enhances clarity and saves space in exposition. In an alternative embodiment, member data could be defined in a private scope, and access methods (member functions) could be provided to manipulate member data indirectly, in accordance with normal practice in object-oriented programming. In the demonstration module, ordinary practice is followed, and member data is exhibited in a private scope with edit, reset, and view access provided by member functions.

In the exemplary embodiments of the operants which process a module specification, error handling and reporting has been suppressed to enhance clarity and save space. In an alternative embodiment, boolean return values from dispatches and failure status from delegations could be examined and appropriate error handling and reporting could be provided. In another alternative embodiment, which is not preferred, error handling could be completely ignored, and void returns could be used for handlers.

In the exemplary embodiment, the module definition is presented in the C++ programming language. In an alternative embodiment, Java or C# could serve for module definition, with suitable modifications to accommodate differences in template programming, inheritance, etc. Other target languages could be utilized with variable efforts, depending on the degree of support for inheritance and polymorphism in dispatch.

I claim:

1. A computer-implemented method of processing a module specification to produce a module definition, comprising the steps of:
   processing, by a processor, a module instance to produce a plurality of categorical class definitions,
      said module instance included in said module specification,
      said module instance having a plurality of categorical class instances, and
      said plurality of categorical class definitions included in said module definition;
   processing, by a processor, said module instance to produce a visitor definition,
      said visitor definition included in said module definition, and
      said visitor definition having a plurality of class visit definitions;
   processing, by a processor, a categorical class instance to produce a categorical class definition,
      said categorical class instance one of said plurality of categorical class instances,
      said categorical class instance having a plurality of datum instances,
      said categorical class instance associated with at least one genus instance,
      said genus instance one of said plurality of categorical class instances,
      said categorical class definition one of said plurality of categorical class definitions,
      said categorical class definition having a plurality of member data definitions, and
      said categorical class definition having a visit dispatch definition;
   processing, by a processor, a datum instance to produce a member data definition,
      said datum instance one of said plurality of datum instances,
      said datum instance having an optional meron qualification, and
      said member data definition one of said plurality of member data definitions;
   processing, by a processor, said categorical class instance to produce a class visit definition,
      said class visit definition one of said plurality of class visit definitions,
      said class visit definition having a plurality of meron visit dispatch definitions, and
      said class visit definition having at least one base class visit dispatch definition;
   processing, by a processor, said datum instance to produce a meron visit dispatch definition, according to said optional meron qualification, said meron visit dispatch definition one of said plurality of meron visit dispatch definitions; and
   processing, by a processor, said genus instance to produce said at least one base class visit dispatch definition.

2. The method of claim 1, wherein,
said visit dispatch definition is a view dispatch definition;
said meron visit dispatch definition is a meron view dispatch definition; and
said at least one base class visit dispatch definition is a base class view dispatch definition.

3. The method of claim 1, wherein,
said visit dispatch definition is an edit dispatch definition;
said meron visit dispatch definition is a meron edit dispatch definition; and
said at least one base class visit dispatch definition is a base class edit dispatch definition.

4. The method of claim 1, comprising the additional steps of:
   processing said module instance to produce a host definition,
      said module instance having a plurality of host datum instances,
      said host definition included in said module definition, and
      said host definition having a plurality of host member data definitions; and
   processing a host datum instance to produce a host member data definition,
      said host datum instance one of said plurality of host datum instances,
      said host datum instance having said optional meron qualification, and
      said host member data definition one of said plurality of host member data definitions.

5. The method of claim 4, comprising the additional steps of:
   processing said host datum instance to produce a cleanup definition according to said optional meron qualification, said cleanup definition included in said host definition.

6. The method of claim 1, comprising the additional step of:
- processing said datum instance to produce a cleanup definition according to said optional meron qualification, said cleanup definition included in said categorical class definition.

7. A computer-implemented apparatus configured to process a module specification to produce a module definition, comprising:
- a processor configured to:
- process a module instance to produce a plurality of categorical class definitions,
  - said module instance included in said module specification,
  - said module instance having a plurality of categorical class instances, and
  - said plurality of categorical class definitions included in said module definition;
- process said module instance to produce a visitor definition,
  - said visitor definition included in said module definition, and
  - said visitor definition having a plurality of class visit definitions;
- process a categorical class instance to produce a categorical class definition,
  - said categorical class instance one of said plurality of categorical class instances,
  - said categorical class instance having a plurality of datum instances,
  - said categorical class instance associated with at least one genus instance,
  - said genus instance one of said plurality of categorical class instances,
  - said categorical class definition one of said plurality of categorical class definitions,
  - said categorical class definition having a plurality of member data definitions, and
  - said categorical class definition having a visit dispatch definition;
- process a datum instance to produce a member data definition,
  - said datum instance one of said plurality of datum instances,
  - said datum instance having an optional meron qualification, and
  - said member data definition one of said plurality of member data definitions;
- process said categorical class instance to produce a class visit definition,
  - said class visit definition one of said plurality of class visit definitions,
  - said class visit definition having a plurality of meron visit dispatch definitions, and
  - said class visit definition having at least one base class visit dispatch definition;
- process said datum instance to produce a meron visit dispatch definition, according to said optional meron qualification, said meron visit dispatch definition one of said plurality of meron visit dispatch definitions; and
- process said genus instance to produce said at least one base class visit dispatch definition.

8. The apparatus of claim 7, wherein,
said visit dispatch definition is a view dispatch definition;
said meron visit dispatch definition is a meron view dispatch definition; and
said at least one base class visit dispatch definition is a base class view dispatch definition.

9. The apparatus of claim 7, wherein,
said visit dispatch definition is an edit dispatch definition;
said meron visit dispatch definition is a meron edit dispatch definition; and
said at least one base class visit dispatch definition is a base class edit dispatch definition.

10. The apparatus of claim 7, additionally comprising:
process said module instance to produce a host definition,
- said module instance having a plurality of host datum instances,
- said host definition included in said module definition, and
- said host definition having a plurality of host member data definitions; and
process a host datum instance to produce a host member data definition,
- said host datum instance one of said plurality of host datum instances,
- said host datum instance having said optional meron qualification, and
- said host member data definition one of said plurality of host member data definitions.

11. The apparatus of claim 10, additionally comprising:
process said host datum instance to produce a cleanup definition according to said optional meron qualification, said cleanup definition included in said host definition.

12. The apparatus of claim 7, additionally comprising:
process said datum instance to produce a cleanup definition according to said optional meron qualification, said cleanup definition included in said categorical class definition.

13. A non-transitory computer-readable medium having stored thereon computer code for processing a module specification to produce a module definition, which when executed by a processor to perform steps of:
- processing a module instance to produce a plurality of categorical class definitions,
  - said module instance included in said module specification,
  - said module instance having a plurality of categorical class instances, and
  - said plurality of categorical class definitions included in said module definition;
- processing said module instance to produce a visitor definition,
  - said visitor definition included in said module definition, and
  - said visitor definition having a plurality of class visit definitions;
- processing a categorical class instance to produce a categorical class definition,
  - said categorical class instance one of said plurality of categorical class instances,
  - said categorical class instance having a plurality of datum instances,
  - said categorical class instance associated with at least one genus instance,
  - said genus instance one of said plurality of categorical class instances,
  - said categorical class definition one of said plurality of categorical class definitions,
  - said categorical class definition having a plurality of member data definitions, and said categorical class definition having a visit dispatch definition;
processing a datum instance to produce a member data definition,
- said datum instance one of said plurality of datum instances,
- said datum instance having an optional meron qualification, and
- said member data definition one of said plurality of member data definitions;

processing said categorical class instance to produce a class visit definition,
- said class visit definition one of said plurality of class visit definitions,
- said class visit definition having a plurality of meron visit dispatch definitions, and
- said class visit definition having at least one base class visit dispatch definition;

processing said datum instance to produce a meron visit dispatch definition, according to said optional meron qualification, said meron visit dispatch definition one of said plurality of meron visit dispatch definitions; and processing said genus instance to produce said at least one base class visit dispatch definition.

14. The article of claim 13, wherein,
said visit dispatch definition is a view dispatch definition;
said meron visit dispatch definition is a meron view dispatch definition; and
said at least one base class visit dispatch definition is a base class view dispatch definition.

15. The article of claim 13, wherein,
said visit dispatch definition is an edit dispatch definition;
said meron visit dispatch definition is a meron edit dispatch definition; and
said at least one base class visit dispatch definition is a base class edit dispatch definition.

16. The article of claim 13, additionally comprising:
a host definition having a plurality of host member data definitions.

17. The article of claim 16, additionally comprising:
a cleanup definition, included in said host definition.

18. The article of claim 13, additionally comprising:
a cleanup definition, included in said categorical class definition.

* * * * *